(12) United States Patent
O'Brien et al.

(10) Patent No.: US 9,840,339 B1
(45) Date of Patent: Dec. 12, 2017

(54) SENSORS EMBEDDED WITHIN AERIAL VEHICLE CONTROL SURFACES

(71) Applicant: Amazon Technologies, Inc., Seattle, WA (US)

(72) Inventors: Barry James O'Brien, Seattle, WA (US); Joshua John Watson, Seattle, WA (US); Scott Michael Wilcox, Bothell, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/138,867

(22) Filed: Apr. 26, 2016

(51) Int. Cl.
| | | |
|---|---|---|
| B64D 47/08 | (2006.01) | |
| B64C 39/02 | (2006.01) | |
| G05D 1/04 | (2006.01) | |
| B64D 47/02 | (2006.01) | |
| B64C 3/38 | (2006.01) | |

(52) U.S. Cl.
CPC ............ B64D 47/08 (2013.01); B64C 3/38 (2013.01); B64C 39/02 (2013.01); B64D 47/02 (2013.01); G05D 1/042 (2013.01); B64C 2201/042 (2013.01); B64C 2201/127 (2013.01); B64C 2201/14 (2013.01)

(58) Field of Classification Search
CPC ........ B64D 47/08; B64D 47/02; G05D 1/042; B64C 39/02; B64C 3/38; B64C 2201/127; B64C 2201/042; B64C 2201/14
See application file for complete search history.

(56) References Cited

U.S. PATENT DOCUMENTS

| | | | | | |
|---|---|---|---|---|---|
| 5,769,359 | A | * | 6/1998 | Rutan | B64C 3/385 244/120 |
| 6,056,237 | A | * | 5/2000 | Woodland | B64C 3/40 244/120 |
| 9,030,149 | B1 | * | 5/2015 | Chen | F16M 13/04 318/638 |
| 2003/0230671 | A1 | * | 12/2003 | Dunn | B64D 27/24 244/53 R |
| 2012/0145834 | A1 | * | 6/2012 | Morgan | B64C 5/02 244/90 R |
| 2013/0194816 | A1 | * | 8/2013 | Hager | F21S 48/115 362/487 |
| 2014/0098990 | A1 | * | 4/2014 | Vian | G06K 9/00671 382/103 |
| 2014/0158816 | A1 | * | 6/2014 | DeLorean | B64C 29/0033 244/12.4 |
| 2014/0368637 | A1 | * | 12/2014 | Yeeles | G01B 21/042 348/135 |

(Continued)

*Primary Examiner* — Rodney Butler
(74) *Attorney, Agent, or Firm* — Athorus, PLLC

(57) ABSTRACT

Aerial vehicles may include one or more directional sensors embedded into wings, rudders, ailerons, flaps or other control surfaces. When the aerial vehicles are operating in modes that do not require the use of such surfaces, a surface having a directional sensor embedded therein may be repositioned or reoriented to align the directional sensor toward an area or axis of interest, and information may be gathered from the area or axis of interest using the directional sensor. One or more safety lights, running lights or other illuminators may cast light of a desired color, frequency or wavelength toward the area or axis of interest. The directional sensors may include cameras, radar or laser sensors, or any other reorientable sensors.

20 Claims, 19 Drawing Sheets

(56) References Cited

U.S. PATENT DOCUMENTS

| | | | |
|---|---|---|---|
| 2015/0331426 A1* | 11/2015 | Shi | B64D 31/06 |
| | | | 701/4 |
| 2015/0367957 A1* | 12/2015 | Uskert | H04N 7/185 |
| | | | 348/38 |
| 2016/0070260 A1* | 3/2016 | Levien | G05D 1/00 |
| | | | 701/3 |
| 2016/0159473 A1* | 6/2016 | Wang | B64C 39/024 |
| | | | 244/17.23 |
| 2016/0163206 A1* | 6/2016 | Fisher | B64C 39/024 |
| | | | 701/2 |
| 2016/0214713 A1* | 7/2016 | Cragg | B64C 39/024 |
| 2016/0272317 A1* | 9/2016 | Cho | G08G 1/09 |

* cited by examiner

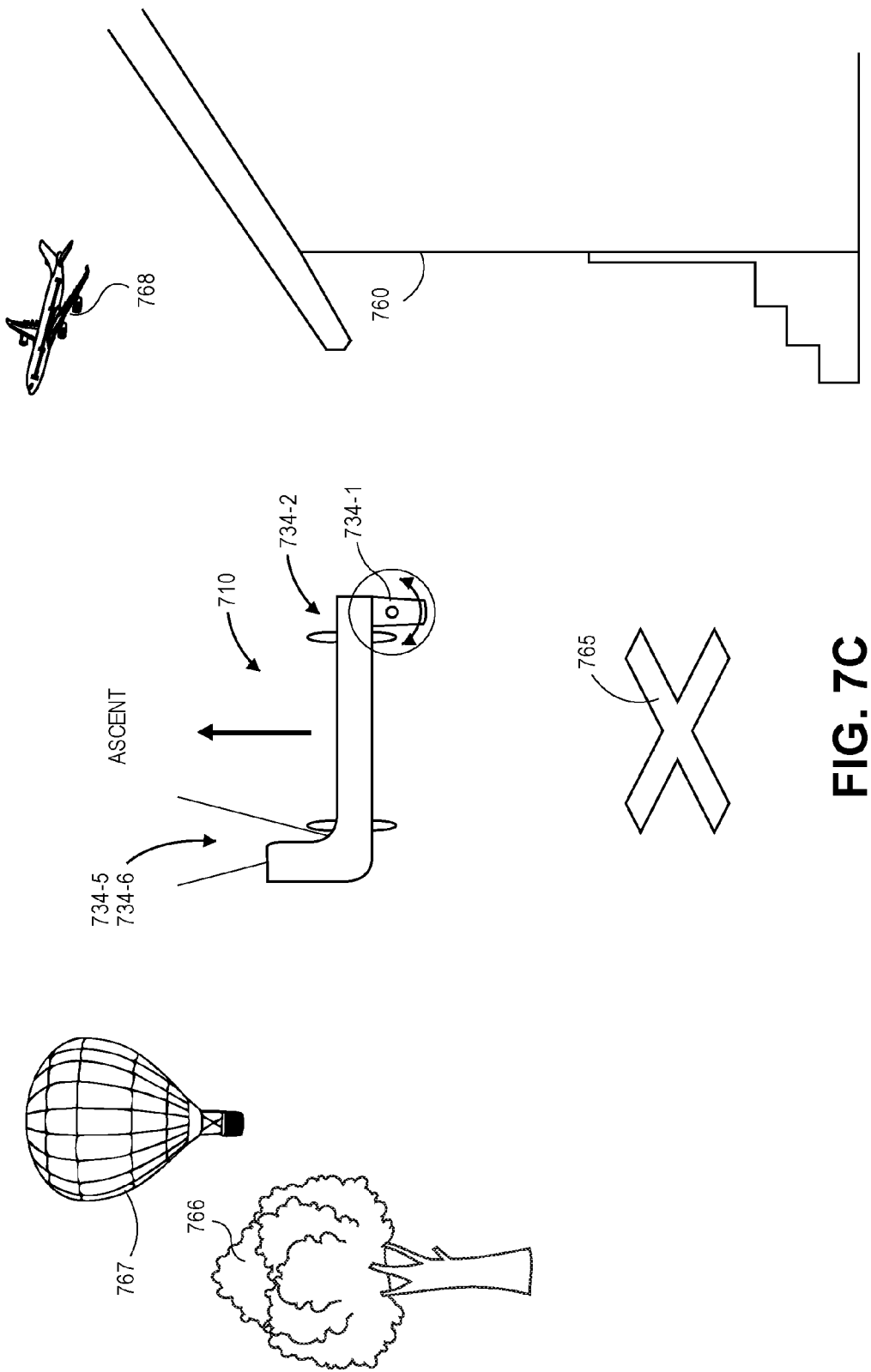

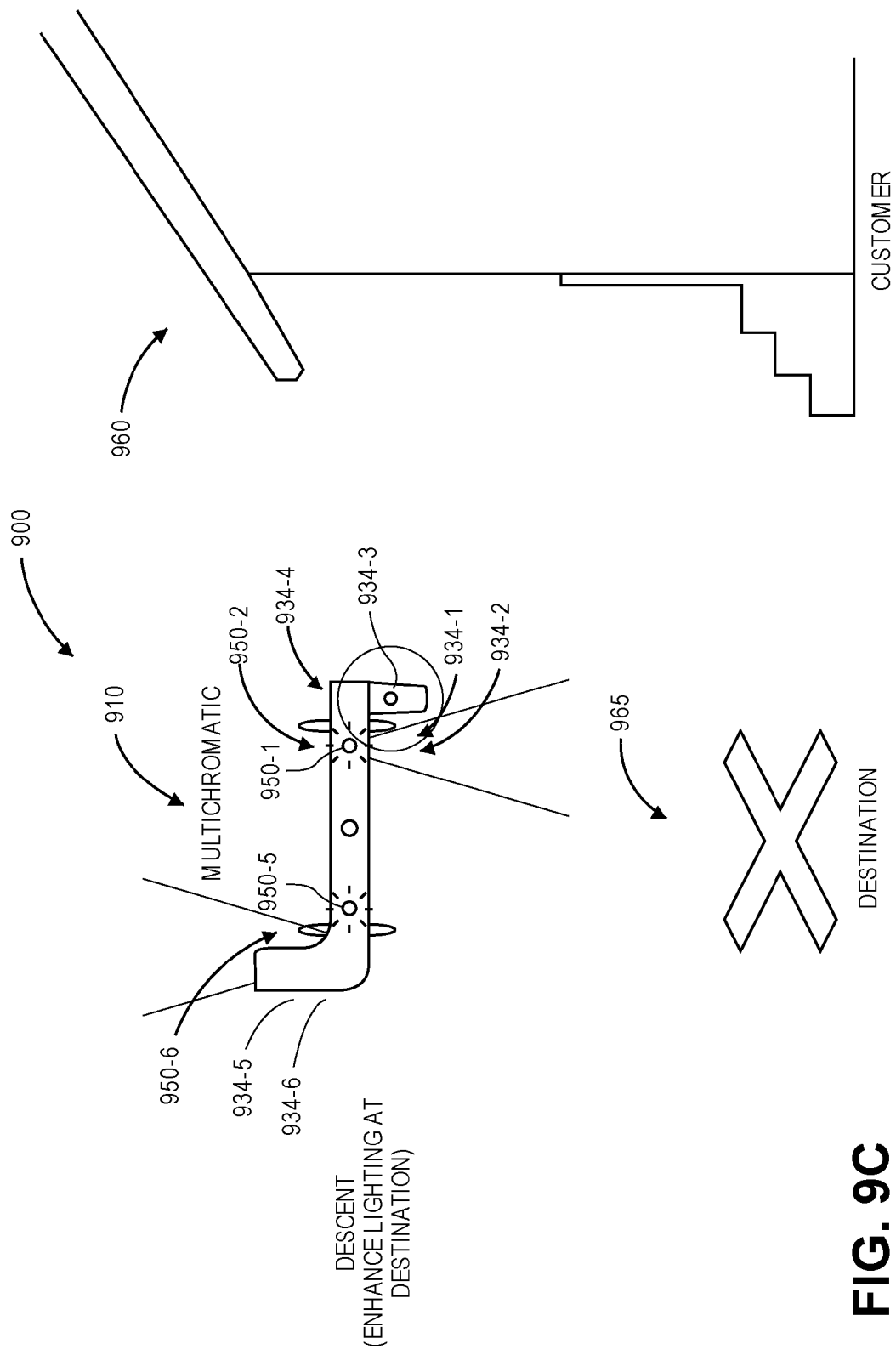

SENSORS EMBEDDED WITHIN AERIAL VEHICLE CONTROL SURFACES

BACKGROUND

Many aerial vehicles (e.g., manned or unmanned vehicles such as airplanes, helicopters or other airships) are configured to operate in two or more flight modes. As one example, an aerial vehicle may be configured to engage in forward flight, or substantially horizontal flight, a mode in which the aerial vehicle travels from one point in space (e.g., a land-based point or, alternatively, a sea-based or air-based point) to another point by traveling over at least a portion of the Earth. In forward flight, the aerial vehicle may be maintained aloft by one or more net forces of lift that are typically induced by airflow passing over and below wings, consistent with a pressure gradient. As another example, an aerial vehicle may be configured to engage in vertical flight, a mode in which the aerial vehicle travels in a vertical or substantially vertical direction from one altitude to another altitude (e.g., upward or downward, from a first point on land, on sea or in the air to a second point in the air, or vice versa) substantially normal to the surface of the Earth, or hovers (e.g., maintains a substantially constant altitude), with an insubstantial change in horizontal or lateral position. In vertical flight, the aerial vehicle may be maintained aloft by one or more net forces of lift that are typically induced by rotating blades of a propeller or another source. As yet another example, an aerial vehicle may be configured to engage in both forward and vertical flight, a hybrid mode in which a position of the aerial vehicle changes in both horizontal and vertical directions.

An aerial vehicle that is configured to operate in multiple modes may utilize one or more propulsion systems and/or control surfaces (e.g., wings, rudders, ailerons, flaps or other components) at different times, depending on requirements of a given mission in which the aerial vehicle is to operate in each of such modes. For example, an aerial vehicle may utilize a first set of motors or rotors when operating in forward flight, and a second set of motors or rotors when operating in horizontal flight. Likewise, the aerial vehicle may utilize a first set of control surfaces when operating in horizontal flight, and a second set of control surfaces when operating in vertical flight. When motors, rotors, control surfaces or other components of an aerial vehicle are not being utilized for propulsion or control, such components merely act as dead weight to the aerial vehicle.

The use of imaging devices or other sensors on aerial vehicles is increasingly common. In particular, unmanned aerial vehicles, or UAVs, are frequently equipped with one or more imaging devices such as digital cameras; position sensors such as Global Positioning System, or GPS, sensors; radar sensors; or laser sensors, such as light detection and ranging, or LIDAR, sensors. Such sensors aid in the guided or autonomous operation of an aerial vehicle, and may be used to determine when the aerial vehicle has arrived at or passed over a given location, when the aerial vehicle is within range of one or more structures, features, objects or humans (or other animals), or for any other purpose. Outfitting an aerial vehicle with one or more of such sensors typically requires installing housings, turrets or other structures or features by which such sensors may be mounted to the aerial vehicle. Such structures or features add weight to the aerial vehicle, and may increase the amount or extent of drag encountered during flight, thereby exacting a substantial operational cost from the aerial vehicle for the use of such sensors in exchange for their many benefits.

BRIEF DESCRIPTION OF THE DRAWINGS

FIGS. 7A through 7D are views of aspects of one system including an aerial vehicle having one or more sensors embedded within control surfaces in accordance with embodiments of the present disclosure.

FIGS. 9A through 9C are views of aspects of one aerial vehicle having one or more addressable illuminators and imaging devices in accordance with embodiments of the present disclosure.

DETAILED DESCRIPTION

Figure 1A:
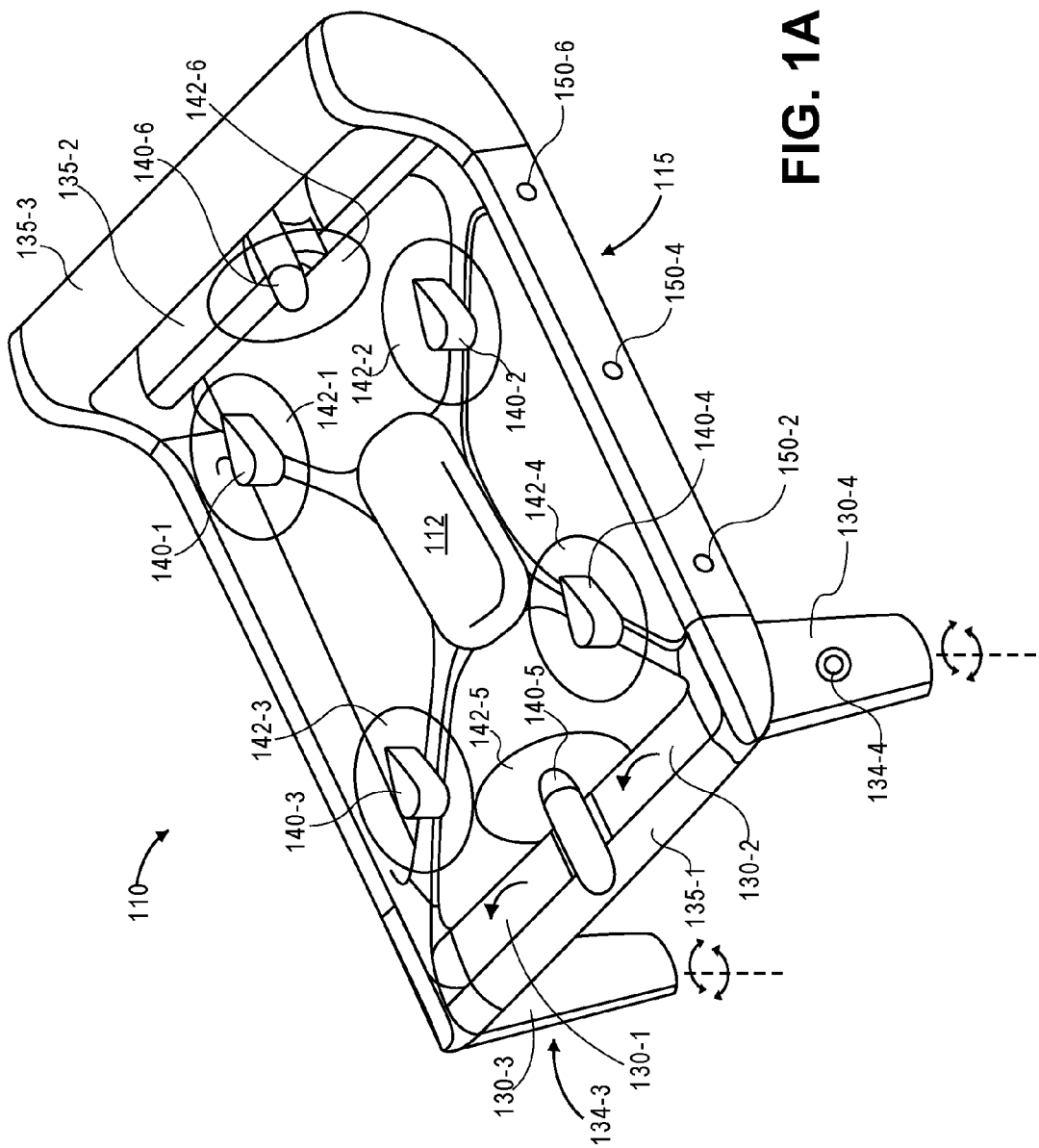
FIGS. 1A through 1F are views of aspects of one system including an aerial vehicle having one or more sensors embedded within control surfaces in accordance with embodiments of the present disclosure.

As is set forth in greater detail below, the present disclosure is directed to aerial vehicles having one or more sensors embedded within movable (e.g., repositionable or reorientable) control surfaces such as wings, rudders, ailerons, elevators, flaps, brakes or slats, or other features. The sensors may be directional in nature, such as digital cameras or other imaging devices, as well as radar sensors, laser sensors, or any other sensor that is configured to capture information or data in a specific direction or along a specific axis. When aerial vehicles having one or more of such sensors embedded within one or more control surfaces operate in modes for which the use of the control surfaces is neither desired nor required for safe operation, the control surfaces may be rotated, translated or otherwise repositioned or reoriented in order to align the sensors as needed to capture information or data of any type or form. For example, when an unmanned aerial vehicle having adjustable powered propellers, wings or other airfoils for remaining aloft during forward or horizontal flight and one or more powered propellers for remaining aloft during vertical flight transitions from a forward or horizontal flight mode to a vertical flight mode, the wings or airfoils are no longer required for operation. Embedding one or more directional sensors, such as digital cameras, into such wings or airfoils permits the sensors to be repositioned or reoriented using the same motors or other components that are provided in order to adjust the wings or airfoils. Thus, by embedding directional sensors into control surfaces that are already designed to be adjusted, aerial vehicles may be configured to include readily adjustable sensors without the use of dedicated housings, turrets or other structures or features.

Additionally, the present disclosure is also directed to aerial vehicles having one or more lights or other addressable illuminators, e.g., safety lights, running lights or normal operating lights, that may be selectively operated during operation of an aerial vehicle in order to project light of any color, frequency or wavelength in one or more directions, thereby aiding in the capture of imaging data by one or more onboard imaging devices, or enhancing the quality of imaging data captured thereby. For example, where an aerial vehicle is equipped with a red port running light, a green starboard running light and one or white or multichromatic lights, as well as one or more imaging devices to capture imaging data for guidance, surveillance, collision avoidance (e.g., where the aerial vehicle is either airborne or grounded, such as while taxiing) or any other purpose, one or more of the lights may be activated, as necessary, to optimize the available light within an area in which the aerial vehicle is operating, or to otherwise achieve a desired lighting condition in the area, and to enhance the quality or relevance of the imaging data captured by the imaging devices. The lights or other illuminators may be provided in fixed positions or orientations on an aerial vehicle or, like one or more of the directional sensors disclosed herein, embedded or otherwise disposed in a control surface or other adjustable component.

Figure 1B:
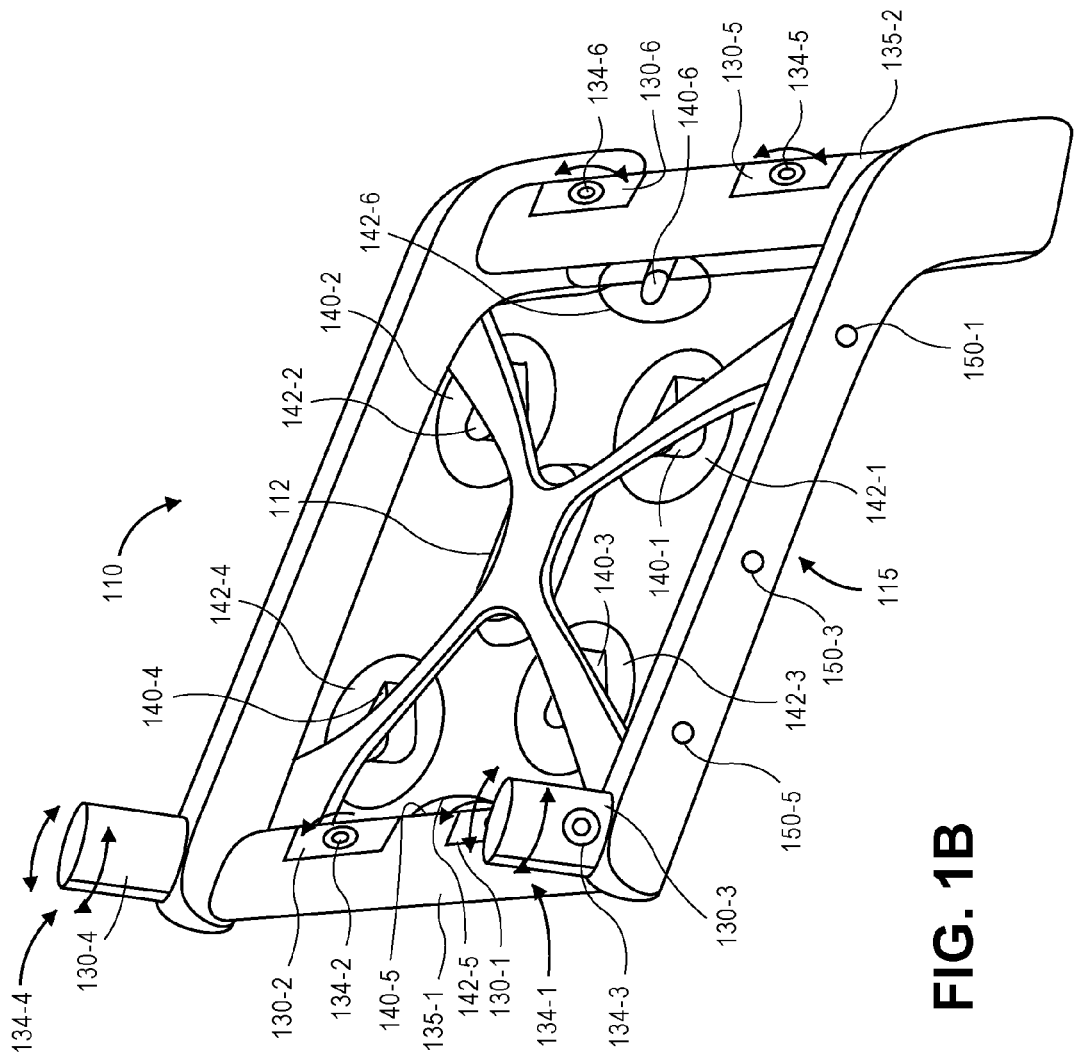

Referring to FIGS. 1A through 1G, a system 100 including an aerial vehicle 110 is shown. FIG. 1A is a perspective view of an upper side of the aerial vehicle 110, and FIG. 1B is a perspective view of an underside of the aerial vehicle 110. As is shown in FIGS. 1A and 1B, the aerial vehicle 110 includes a frame 115 having a plurality of movable control surfaces 130-1, 130-2, 130-3, 130-4, 130-5, 130-6, and a plurality of fixed control surfaces 135-1, 135-2, 135-5, a plurality of motors 140-1, 140-2, 140-3, 140-4, 140-5, 140-6 mounted thereto. The motors 140-1, 140-2, 140-3, 140-4 are coupled to propellers 142-1, 142-2, 142-3, 142-4, each of which is configured to rotate about an axis that is substantially vertical with respect to the frame 115 under power, thereby generating downward forces of lift on the aerial vehicle 110 during operation. The motors 140-5, 140-6 are coupled to propellers 142-5, 142-6, each of which is configured to rotate about an axis that is substantially horizontal with respect to the frame 115, thereby generating forward forces of thrust on the aerial vehicle 110 during operation. The aerial vehicle 110 further includes a control system 112 provided substantially centrally with respect to the frame 115, as well as a plurality of lights (or other addressable illuminators) 150-1, 150-2, 150-3, 150-4, 150-5, 150-6 provided on either side of the frame 115.

As is shown in FIGS. 1A and 1B, each of the movable control surfaces 130-1, 130-2, 130-3, 130-4, 130-5, 130-6 includes an imaging device 134-1, 134-2, 134-3, 134-4, 134-5, 134-6 or other directional sensor embedded therein. For example, as is also shown in FIG. 1A and FIG. 1B, the fixed control surface 135-1 is a front wing of the aerial vehicle 110, and the movable control surfaces 130-1, 130-2 are flaps or ailerons disposed at a trailing edge of the fixed control surface 135-1. The movable control surfaces 130-3, 130-4 are pivotable winglets disposed at a front end of the aerial vehicle 110. The fixed control surface 135-2 is a lower rear wing of the aerial vehicle 110, and the movable control surfaces 130-5, 130-6 are flaps, ailerons or other movable surfaces disposed at a trailing edge of the fixed control surface 135-2. The fixed control surface 135-3 is an upper rear wing of the aerial vehicle. Thus, as is shown in FIGS. 1A and 1B, the imaging devices 134-3, 134-4 have lenses or other optical elements that are aligned substantially laterally on the movable control surfaces 130-3, 130-4, with fields of view that may be adjusted with the pivoting of the respective movable control surfaces 130-3, 130-4, while the imaging devices 134-1, 134-2, 134-5, 134-6 have lenses or other optical elements that are aligned generally downwardly on the undersides of the movable control surfaces 130-1, 130-2, 130-5, 130-6, with fields of view that may be adjusted with the raising or lowering of the respective movable control surfaces 130-1, 130-2, 130-5, 130-6.

Figure 1C:
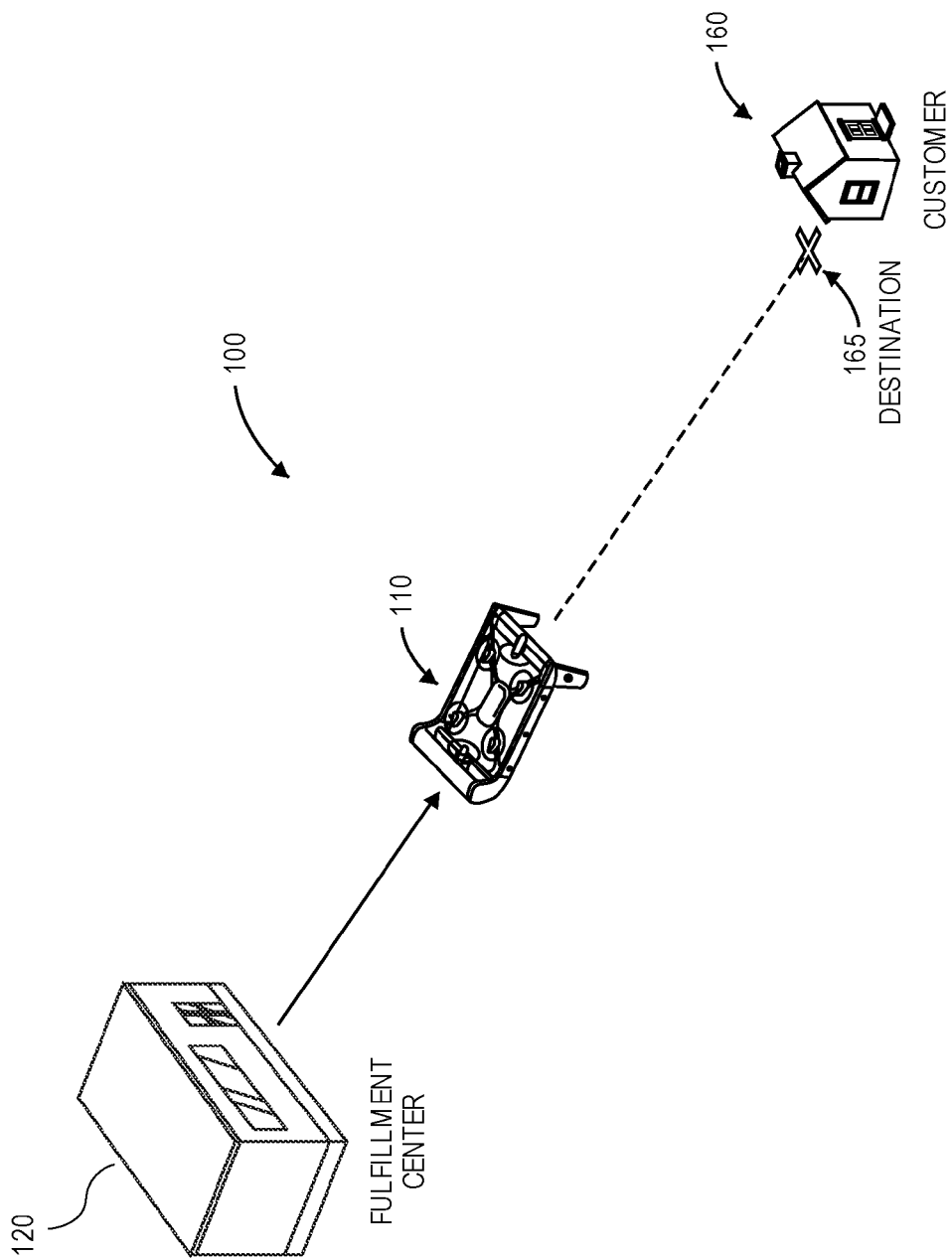

In accordance with the present disclosure, aerial vehicles having one or more sensors embedded within adjustable control surfaces, and a plurality of addressable illuminators, such as the aerial vehicle 110, may be used in any type or form of mission including but not limited to deliveries of items from origins (e.g., fulfillment centers, warehouses or other like facilities or sources of items) to destinations (e.g., locations of customers, or specified by such customers). Referring to FIG. 1C, the aerial vehicle 110 is shown as en route from a fulfillment center 120 or other location where one or more items are housed, to a destination 165 associated with a customer 160, e.g., a point or other location within a vicinity of the customer 160 where the aerial vehicle 110 may safely arrive with one or more items, and from which the aerial vehicle 110 may depart after delivering the one or more items.

Figure 1D:
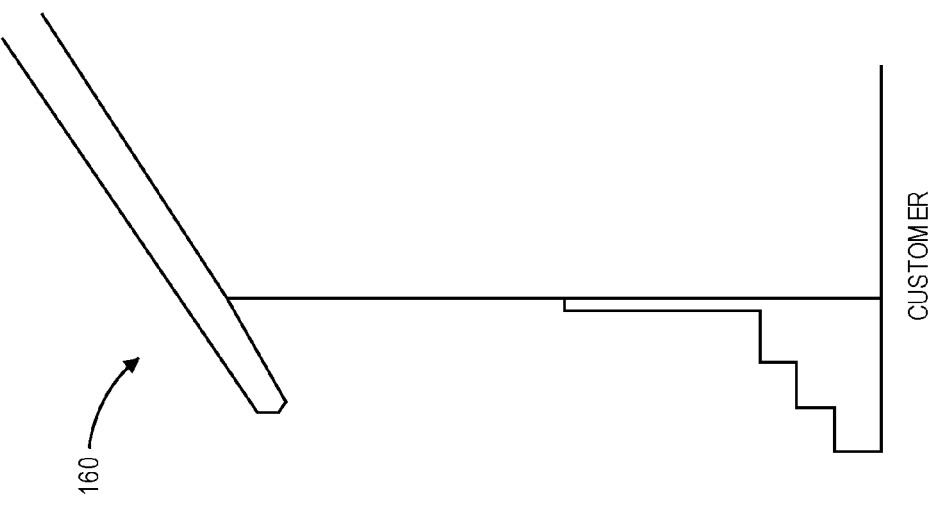
Figure 1D:
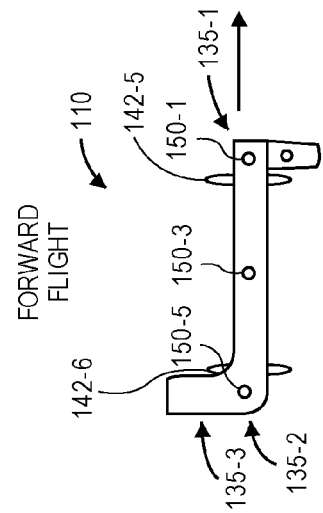

As is discussed above, one or more sensors such as digital cameras or other imaging devices may be embedded into control surfaces and repositioned when the control surfaces are no longer required for operation. Referring to FIG. 1D, the aerial vehicle 110 is shown as approaching the destination 165, which may be characterized by a visible and recognizable fiducial marking or other identifier, e.g., an X-shaped marking near a home of the customer 160, in a forward flight mode. During the approach, the aerial vehicle 110 remains aloft due to lift forces provided by airflow over and under the fixed control surface 135-1 (e.g., the front wing) and the fixed control surfaces 135-2, 135-3 (e.g., the lower and upper rear wings) as the motors 140-5, 140-6 rotate the propellers 142-5, 142-6 to generate a thrusting force in a forward direction. The aerial vehicle 110 is able to autonomously maintain or control a desired course and altitude, as well as a yaw, a pitch or a roll, by operating one or more of the movable control surfaces 130-1, 130-2, 130-5, 130-6 provided on the fixed control surfaces 135-1, 135-2 and/or the movable control surfaces 130-3, 130-4 mounted to the frame 115 while the aerial vehicle 110 is engaged in forward flight.

Figure 1E:
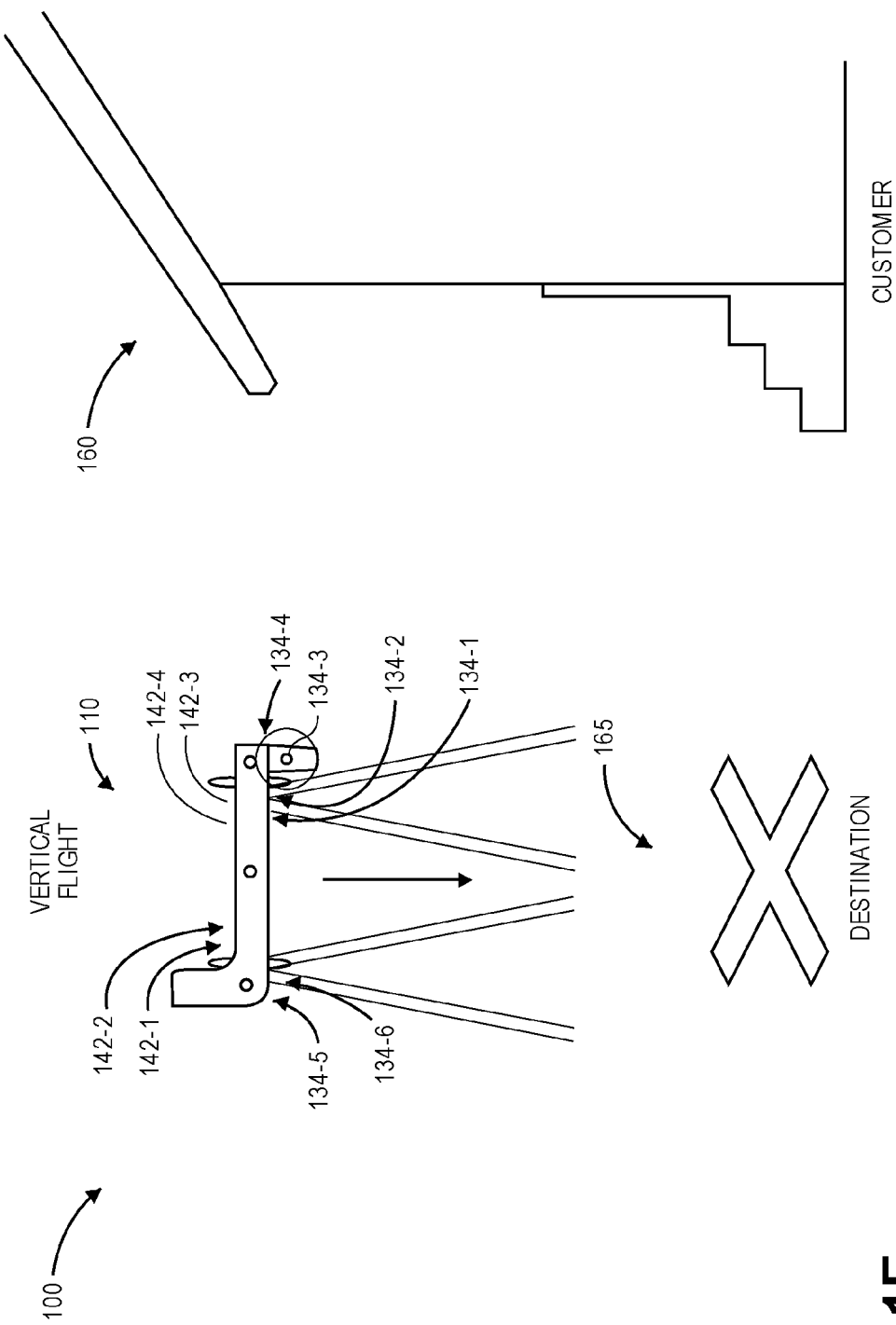
Figure 1F:
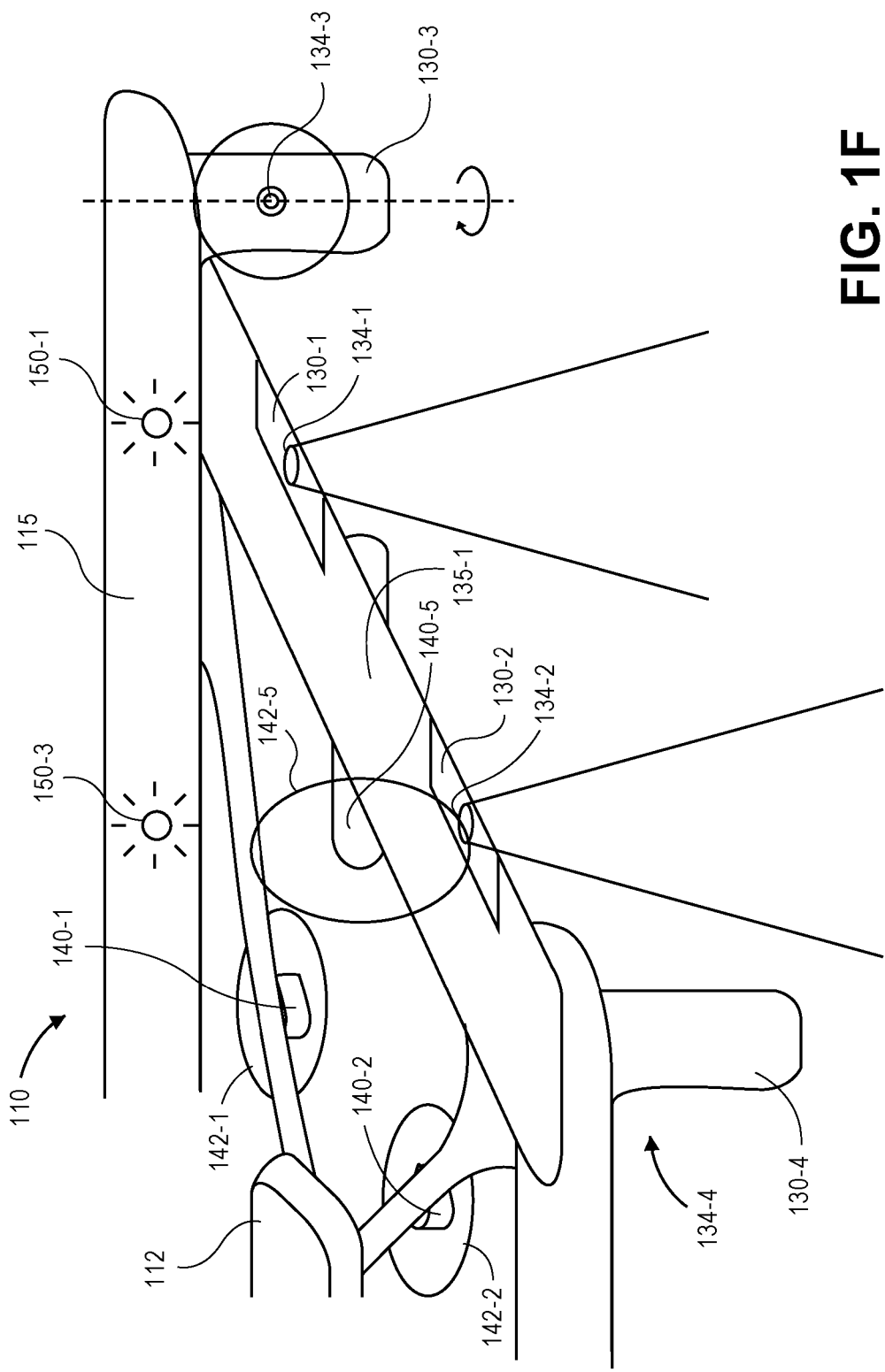

Referring to FIGS. 1E and 1F, the aerial vehicle 110 transitions from a forward flight mode to a vertical flight mode upon reaching the destination 165. In the vertical flight mode, the aerial vehicle 110 remains aloft due to lift forces generated by the rotation of the rotors 142-1, 142-2, 142-3, 142-4 by the motors 140-1, 140-2, 140-3, 140-4, which may be manipulated as necessary in order to cause the aerial vehicle 110 to descend toward the destination 165.

Therefore, because the movable control surfaces 130-1, 130-2, 130-3, 130-4, 130-5, 130-6 are no longer required in order to maintain or control a course, an altitude, a yaw, a pitch or a roll of the aerial vehicle 110 as the aerial vehicle 110 operates in the vertical flight mode, each of the movable control surfaces 130-1, 130-2, 130-3, 130-4, 130-5, 130-6 may be manipulated, as necessary, in order to reposition or reorient the imaging devices 134-1, 134-2, 134-3, 134-4, 134-5, 134-6 provided thereon. For example, the movable control surfaces 130-3, 130-4 may be pivoted in order to scan an area surrounding the aerial vehicle 110 for approaching vehicles or objects using the imaging devices 134-3, 134-4, while the movable control surfaces 130-1, 130-2, 130-5, 130-6 may be raised or lowered to select a landing area at the destination 165, to search for the fiducial marking provided at the destination 165, or to ensure that the destination 165 is free of objects, humans or other animals using the imaging devices 134-1, 134-2, 134-5, 134-6. Additionally, one or more of the lights 150-1, 150-2, 150-3, 150-4, 150-5, 150-6 may be operated, as necessary, in order to optimize the lighting conditions at the destination 165 and enhance the capacity of each of the imaging devices 134-1, 134-2, 134-3, 134-4, 134-5, 134-6 to capture imaging data of sufficient clarity and relevance during its descent.

In accordance with the present disclosure, directional sensors may be installed or otherwise embedded into control surfaces of an aerial vehicle. For example, an aerial vehicle such as a UAV (or "drone") may include one or more wings, rudders, ailerons, elevators, flaps, brakes, slats or other control surfaces for controlling a yaw, pitch or roll of the aerial vehicle during forward flight. Such control surfaces may each feature separate motors, pulleys, cables, servo controllers, transducers, hydraulic lines or cylinders or other electrical, mechanical and/or hydraulic components or actuators for causing such control surfaces to change their respective positions or orientations.

For example, a rudder is a movable control surface that is typically joined to a vertical stabilizer or other fixed control surface by a hinged connection and pivoted as desired in order to change a yaw of the aerial vehicle during forward flight, or aligned amidships in order to maintain the yaw of the aerial vehicle constant. Elevators are movable control surfaces that are typically joined in pairs to a horizontal stabilizer or other fixed control surfaces by hinged connections and pivoted in concert, as desired, in order to change a pitch of the aerial vehicle during forward flight, or aligned with the horizontal stabilizer in order to maintain the pitch of the aerial vehicle constant. Ailerons are also movable control surfaces that are typically joined in pairs to wings or other extensions or appurtenances by hinged connections and pivoted separately or in concert, as desired, in order to change a roll of the aerial vehicle during forward flight, or aligned with the wings in order to maintain the roll of the aerial vehicle constant. Additionally, an aerial vehicle may further include one or more slats, spoilers, flaps, brakes or other features for changing or controlling yaw, pitch or roll of the aerial vehicle, or increasing or decreasing amounts of lift forces supplied to the aerial vehicle, during forward flight. Alternatively, an entire wing or stabilizer may be configured for repositioning or reorientation aboard an aerial vehicle, as desired, in order achieve desired levels of yaw, pitch roll, lift or thrust.

In accordance with the present disclosure, one or more imaging devices (e.g., not only digital cameras but also range cameras, depth sensors, infrared sensors, ultrasound imaging devices, X-ray imaging devices) or other directional sensors may be embedded or installed directly into one or more movable control surfaces in a manner that enables sensing elements (e.g., lenses or other optical elements) of such imaging devices or sensors to be repositioned or reoriented using the same motors, controllers or other components for repositioning or reorienting the movable control surfaces into which such imaging devices or sensors are embedded or installed. For example, a movable control surface may be embedded or otherwise outfitted with one or more digital cameras having a similar size or quality as digital cameras that are commonly provided within laptop computers, tablet computers, smartphones or other mobile devices, including but not limited to autofocusing cameras having any number (e.g., eight to forty-eight megapixels) or size of pixel sensors (e.g., approximately one micron), any relative apertures or focal lengths, or any numbers of lenses, filters, or other components that are configured to capture still or moving images and any associated audio signals or metadata (e.g., geotags or date or time stamps).

A movable control surface may also be \outfitted with one or more arrays of radar antennas or receivers that emit and receive, respectively, radar signals or, alternatively, one or more laser transmitters or receivers that emit and receive, respectively, laser beams and reflected light. Any type of directional sensor that is configured to capture information or data within a field of view or along a particular axis or direction may be installed within a movable control surface in accordance with the present disclosure.

In some embodiments, such sensors may be in communication with an onboard control system via wired or wireless means, and may operate independently or autonomously, or under the control of the onboard control system. In some other embodiments, an aerial vehicle or one or more of such sensors may be equipped with one or more databases or data stores for receiving and storing information or data captured thereby, and uploading such information or data to an external system provided in a physical location, or in one or more alternate or virtual locations, e.g., in a "cloud"-based environment. The information or data may be uploaded in real time or in near-real time, or synchronously or asynchronously, or in one or more batch transfers or processing operations.

Additionally, and also in accordance with the present disclosure, an aerial vehicle may be outfitted with one or more lights or addressable illuminators that may be programmed or configured for operation in concert with one or more imaging devices (e.g., digital cameras) provided thereon. Such imaging devices may be embedded into one or more movable control surfaces or fixed in their position or orientation. For example, safety lights, running lights or operating lights may be energized or de-energized, as necessary, to achieve a desired lighting condition within a field of view of one or more of the imaging devices.

As is discussed above, the present disclosure is directed to aerial vehicles having one or more sensors embedded within movable control surfaces such as wings, rudders, ailerons, elevators, flaps, brakes or slats, or other features. The present disclosure should not be understood to preclude one or more the aerial vehicles described herein from including one or more directional sensors that are mounted elsewhere on an aerial vehicle, e.g., in locations other than on a movable control surface. Similarly, the present disclosure should not be understood to preclude one or more of the aerial vehicles described herein from including movable control surfaces that do not have any directional sensors embedded therein. Likewise, directional sensors that are embedded within control surfaces may be used to capture information or data regardless of whether such control surfaces are being used to maintain a course, an altitude, a yaw, a pitch or a roll of an aerial vehicle.

Moreover, as is also discussed above, the present disclosure is directed to aerial vehicles having one or more lights or other addressable illuminators, e.g., safety lights, running lights or normal operating lights, that may be selectively operated in concert with one or more onboard imaging devices. The present disclosure should not be understood to preclude one or more the aerial vehicles described herein from including lights or other illuminators that are operated separately and apart from one or more imaging devices provided on the aerial vehicles. Furthermore, the imaging devices with which the lights or addressable illuminators are operated in concert may be provided on one or more movable control surfaces, and permitted to be repositioned or reoriented accordingly, or fixed in their respective positions or orientations.

Figure 2:
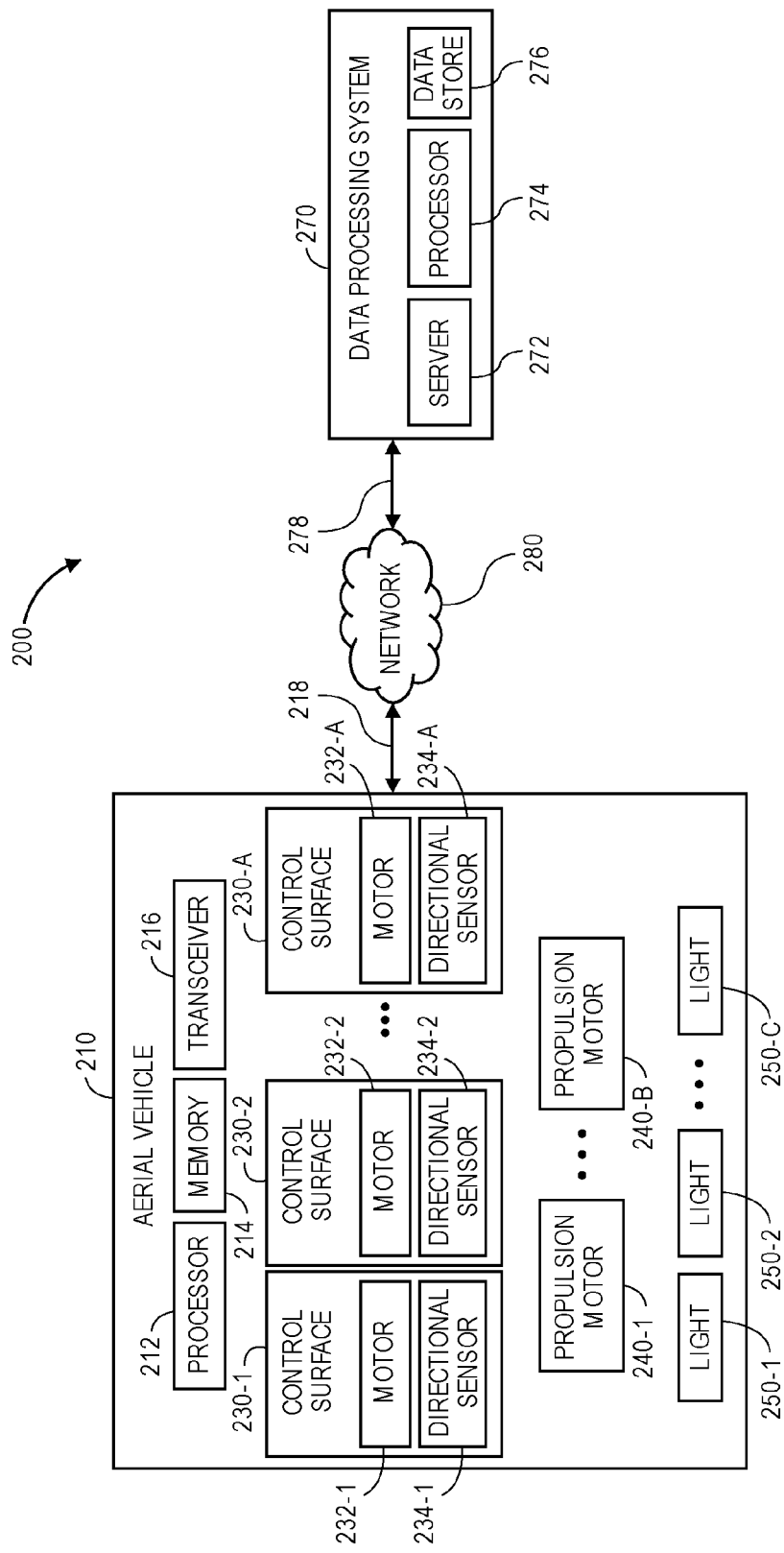
FIG. 2 is a block diagram of one system including an aerial vehicle having one or more sensors embedded within control surfaces in accordance with embodiments of the present disclosure.

Referring to FIG. 2, a block diagram of components of one system 200 for operating an aerial vehicle having one or more embedded sensors in accordance with embodiments of the present disclosure is shown. The system 200 of FIG. 2 includes an aerial vehicle 210 and a data processing system 270 connected to one another over a network 280, which may include the Internet, in whole or in part. Except where otherwise noted, reference numerals preceded by the number "2" shown in FIG. 2 indicate components or features that are similar to components or features having reference numerals preceded by the number "1" shown in FIGS. 1A through 1F.

The aerial vehicle 210 includes a processor 212, a memory 214 and a transceiver 216, a plurality of control surfaces 230-1, 230-2 . . . 230-a, a plurality of propulsion motors 240-1 . . . 240-b, and a plurality of lights (or other addressable illuminators) 250-1, 250-2 . . . 250-c.

The processor 212 may be configured to perform any type or form of computing function, including but not limited to the execution of one or more machine learning algorithms or techniques. For example, the processor 212 may control any aspects of the operation of the aerial vehicle 210 and the one or more computer-based components thereon, including but not limited to the control surfaces 230-1, 230-2 . . . 230-a, the propulsion motors 240-1 . . . 240-b, and the lights 250-1, 250-2 . . . 250-c. For example, the processor 212 may control the operation of one or more control systems or modules (not shown) that for generating instructions for conducting operations thereof, e.g., for operating one or more of the control surfaces 230-1, 230-2 . . . 230-a, the propulsion motors 240-1 . . . 240-b, or the lights 250-1, 250-2 . . . 250-c. Such control systems or modules may be associated with one or more other computing devices or machines, and may communicate with the data processing system 270 or one or more other computer devices (not shown) over the network 280, through the sending and receiving of digital data. The aerial vehicle 210 further includes one or more memory or storage components 214 (such as databases or data stores) for storing any type of information or data, e.g., instructions for operating the aerial vehicle 210, or information or data captured during operations of the aerial vehicle 210.

The processor 212 may be a uniprocessor system including one processor, or a multiprocessor system including several processors (e.g., two, four, eight, or another suitable number), and may be capable of executing instructions. For example, in some embodiments, the processor 212 may be a general-purpose or embedded processor implementing any of a number of instruction set architectures (ISAs), such as the x86, PowerPC, SPARC, or MIPS ISAs, or any other suitable ISA. Where the processor 212 is a multiprocessor system, each of the processors within the multiprocessor system may operate the same ISA, or different ISAs.

The processor 212 may be provided as a portion of, or may be further configured to operate, one or more control systems such as electronic speed controls, power supplies, navigation systems and/or payload engagement controllers for engaging with or releasing items, as desired. For example, the processor 212 may be configured to cause or control the operation of one or more of the control surfaces 230-1, 230-2 . . . 230-a, the propulsion motors 240-1 . . . 240-b and/or the lights 250-1, 250-2 . . . 250-c, such as by repositioning one or more of such control surfaces 230-1, 230-2 . . . 230-a to within a desired range, or to cause one or more of the propulsion motors 240-1 . . . 240-b to operate at a desired speed, in order to guide the aerial vehicle 210 along a determined or desired flight path, and to illuminate or darken one or more of the lights 250-1, 250-2 . . . 250-c in one or more colors or at one or more frequencies or wavelengths.

Additionally, the memory 214 may be configured to store executable instructions, flight paths, flight control parameters and/or other data items accessible by or to the processor 212. The memory 214 may be implemented using any suitable memory technology, such as static random access memory (SRAM), synchronous dynamic RAM (SDRAM), nonvolatile/Flash-type memory, or any other type of memory. In some embodiments, program instructions, flight paths, flight control parameters and/or other data items may be received or sent via the transceiver 216, e.g., by transmission media or signals, such as electrical, electromagnetic, or digital signals, which may be conveyed via a communication medium such as a wired and/or a wireless link.

The transceiver 216 may be configured to enable the aerial vehicle 210 to communicate through one or more wired or wireless means, e.g., wired technologies such as Universal Serial Bus (or "USB") or fiber optic cable, or standard wireless protocols such as Bluetooth® or any Wireless Fidelity (or "WiFi") protocol, such as over the network 280 or directly. The transceiver 216 may further include or be in communication with one or more input/output (or "I/O") interfaces, network interfaces and/or input/output devices, and may be configured to allow information or data to be exchanged between one or more of the components of the aerial vehicle 210, or to one or more other computer devices or systems (e.g., other aerial vehicles, not shown) via the network 280. For example, in some embodiments, the transceiver 216 may be configured to coordinate I/O traffic between the processor 212 and one or more onboard or external computer devices or components. The transceiver 216 may perform any necessary protocol, timing or other data transformations in order to convert data signals from a first format suitable for use by one component into a second format suitable for use by another component. In some embodiments, the transceiver 216 may include support for devices attached through various types of peripheral buses, e.g., variants of the Peripheral Component Interconnect (PCI) bus standard or the Universal Serial Bus (USB) standard. In some other embodiments, functions of the transceiver 216 may be split into two or more separate components, or incorporated directly into the processor 212.

The control surfaces 230-1, 230-2 . . . 230-a may be any sections or appurtenances provided on the aerial vehicle 210 that may be manipulated in order to dynamically modify a position or orientation of the aerial vehicle 210 with respect to one or more degrees of freedom. For example, the control surfaces 230-1, 230-2 . . . 230-a may include, but are not limited to, wings, rudders, ailerons, elevators, flaps, brakes or slats, or other features. As is shown in FIG. 2, each of the control surfaces 230-1, 230-2 . . . 230-a includes a motor 232-1, 232-2 . . . 232-a and a directional sensor 234-1, 234-2 . . . 234-a. The aerial vehicle 210 may include any number a of such control surfaces 230-1, 230-2 . . . 230-a of any kind.

The motors 232-1, 232-2 . . . 232-a may be any electrical, mechanical and/or hydraulic or other component or actuator for rotating, translating or otherwise repositioning or reorienting a respective one of the control surfaces 230-1, 230-2 . . . 230-*a* during operation of the aerial vehicle 210, under the control of the one or more processors 212. The directional sensors 234-1, 234-2 . . . 234-*a* may be any type of sensor or other component that is embedded into one or more aspects of one of the control surfaces 230-1, 230-2 . . . 230-*a* (e.g., a leading edge, a trailing edge, a tip or one or more other faces or aspects of such surfaces 230-1, 230-2 . . . 230-*a*) and configured to gather information or data with respect to an alignment or orientation thereof.

For example, the directional sensors 234-1, 234-2 . . . 234-*a* may include digital cameras or other imaging devices (e.g., depth sensors, range cameras, infrared cameras, radiographic cameras or other optical sensors) that are configured to capture imaging data such as still or moving images, associated audio content or other data or metadata, within a field of view or along a particular axis or direction. In some embodiments, the directional sensors 234-1, 234-2 . . . 234-*a* may be any form of optical recording device that may be used to photograph or otherwise record imaging data during operation of the aerial vehicle 210, for any other purpose. The directional sensors 234-1, 234-2 . . . 234-*a* may include one or more sensors, memory or storage components and processors, and such sensors, memory components or processors may further include one or more photosensitive surfaces, filters, chips, electrodes, clocks, boards, timers or any other relevant features (not shown). For example, such directional sensors 234-1, 234-2 . . . 234-*a* may capture imaging data in the form of one or more still or moving images of any kind or form, as well as any relevant audio signals or other information, and may be connected to the processor 212, the memory 214 and/or the transceiver 216 or with one another by way of a wired or wireless connection that may be dedicated or comprise all or part of an internal network (not shown).

The directional sensors 234-1, 234-2 . . . 234-*a* may also include one or more radar, laser or other sensors (e.g., LIDAR) that are configured to determine distances or ranges to objects along a given axis. Thus, by rotating, translating or otherwise repositioning or reorienting the respective control surfaces 230-1, 230-2 . . . 230-*a*, e.g., using the one or more motors 232-1, 232-2 . . . 232-*a*, the alignment or orientation of the directional sensors 234-1, 234-2 . . . 234-*a* may be varied accordingly. Additionally, the directional sensors 234-1, 234-2 . . . 234-*a* may be adapted or otherwise configured to communicate with the data processing system 270, or to access one or more other computer devices by way of the network 280.

Although each of the control surfaces 230-1, 230-2 . . . 230-*a* of the aerial vehicle 210 shown in FIG. 2 includes one motor 232-1, 232-2 . . . 232-*a* and one directional sensor 234-1, 234-2 . . . 234-*a*, one or more of the surfaces 230-1, 230-2 . . . 230-*a* may include two or more motors 232-1, 232-2 . . . 232-*a* or two or more directional sensors 234-1, 234-2 . . . 234-*a*, which may be of the same or of different types. For example, a single control surface may include two or more digital cameras, as well as one or more radar sensors or laser sensors. Alternatively, the aerial vehicle 210 may further include one or more control surfaces that do not include any sensors embedded therein. Similarly, the aerial vehicle 210 may also include sensors (not shown) that are not mounted on a control surface, or are mounted elsewhere on a fuselage or other component of the aerial vehicle 210, and are fixed or movable in position or orientation. The control surfaces 230-1, 230-2 . . . 230-*a* may also include one or more of the lights 250-1, 250-2 . . . 250-*c* embedded therein.

The propulsion motors 240-1 . . . 240-*b* may be any type or form of motor (e.g., electric, gasoline-powered or any other type of motor) capable of generating sufficient rotational speeds of one or more propellers or other components to provide lift and/or thrust forces to the aerial vehicle 210 and any engaged payload, and to aerially transport the engaged payload thereby. For example, one or more of the propulsion motors 240-1 . . . 240-*b* may be a brushless direct current (DC) motor such as an outrunner brushless motor or an inrunner brushless motor. The aerial vehicle 210 may include any number b of such propulsion motors 240-1 . . . 240-*b* of any kind. For example, one or more of the motors 240-1 . . . 240-*b* may be aligned or configured to provide forces of lift to the aerial vehicle 210, exclusively, while one or more of the propulsion motors 240-1 . . . 240-*b* may be aligned or configured to provide forces of thrust to the aerial vehicle 210, exclusively. Alternatively, one or more of the propulsion motors 240-1 . . . 240-*b* may be aligned or configured to provide forces of lift and forces of thrust to the aerial vehicle 210, as needed. For example, the propulsion motors 240-1 . . . 240-*b* may be fixed in their orientation on the aerial vehicle 210, or configured to vary their respective orientations, e.g., a tilt-rotor aircraft. Moreover, the propulsion motors 240-1 . . . 240-*b* may be aligned or configured to operate with different capacities or ratings, or at different speeds, or coupled to propellers having different sizes and shapes.

The lights 250-1, 250-2 . . . 250-*c* may be any form of addressable light source provided on one or more surfaces of the aerial vehicle 210 that may be independently operated on short order, by way of one or more commands. For example, the lights may be mounted to a fuselage, a fixed control surface, a movable control surface or any other external portion of the aerial vehicle 210, and may be provided for general purposes or dedicated to a specific function, e.g., as a safety light, a running light or an operating light. In some embodiments, the lights 250-1, 250-2 . . . 250-*c* may include one or more light emitting diode ("LED") lights arranged at a single point, in a line or strip, in an array or in one or more polygonal arrangements or configurations (e.g., shapes). Such LED lights, or LEDs, may include one or more diodes that are housed within a transparent plastic bulb or canister-like housing and configured to direct a comparatively large amount of light-based energy for release through the housing.

The lights 250-1, 250-2 . . . 250-*c* may be coupled with the processor 212 individually or collectively, e.g., in series or in parallel, and may be controlled by the processor 212, by way of one or more independently targeted signals received from a hardware component or software interface operating on or associated with the processor 212, or from an external computing device (not shown) by way of the network 280. Additionally, the lights 250-1, 250-2 . . . 250-*c* may be provided in a single color, or in multiple colors, which may be individually programmed or selected, and configured to emit or radiate light in any color, at any frequency or wavelength, or at any level of intensity. In accordance with the present disclosure, the various lights 250-1, 250-2 . . . 250-*c* may be associated with or provided as one or more independent and/or freestanding units. The aerial vehicle 210 may include any number c of such lights 250-1, 250-2 . . . 250-*c* of any kind.

The aerial vehicle 210 may also include any number of other sensors, components or other features for controlling or aiding in the operation of the aerial vehicle 210, including but not limited to one or more environmental or operational sensors for determining one or more attributes of an environment in which the aerial vehicle 210 is operating, or may be expected to operate, including extrinsic information or data or intrinsic information or data. For example, the aerial vehicle 210 may include one or more Global Positioning System ("GPS") receivers or sensors, compasses, speedometers, altimeters, thermometers, barometers, hygrometers, gyroscopes, air monitoring sensors (e.g., oxygen, ozone, hydrogen, carbon monoxide or carbon dioxide sensors), infrared sensors, ozone monitors, pH sensors, magnetic anomaly detectors, metal detectors, radiation sensors (e.g., Geiger counters, neutron detectors, alpha detectors), attitude indicators, depth gauges, accelerometers, or sound sensors (e.g., microphones, piezoelectric sensors, vibration sensors or other transducers for detecting and recording acoustic energy from one or more directions).

The data processing system 270 includes one or more physical computer servers 272 having a plurality of databases 274 associated therewith, as well as one or more computer processors 276 provided for any specific or general purpose. For example, the data processing system 270 of FIG. 2 may be independently provided for the exclusive purpose of receiving, analyzing or storing imaging data or other information or data received from the aerial vehicle 210 or, alternatively, provided in connection with one or more physical or virtual services configured to receive, analyze or store such imaging data or other information or data, as well as one or more other functions. The servers 272 may be connected to or otherwise communicate with the databases 274 and the processors 276. The databases 274 may store any type of information or data, including but not limited to acoustic signals, information or data relating to imaging data, or information or data regarding environmental conditions, operational characteristics, or positions, for any purpose. The servers 272 and/or the computer processors 276 may also connect to or otherwise communicate with the network 280, as indicated by line 278, through the sending and receiving of digital data. For example, the data processing system 270 may include any facilities, stations or locations having the ability or capacity to receive and store information or data, such as media files, in one or more data stores, e.g., media files received from the aerial vehicle 210, or from one another, or from one or more other external computer systems (not shown) via the network 280. In some embodiments, the data processing system 270 may be provided in a physical location. In other such embodiments, the data processing system 270 may be provided in one or more alternate or virtual locations, e.g., in a "cloud"-based environment. In still other embodiments, the data processing system 270 may be provided onboard one or more aerial vehicles, including but not limited to the aerial vehicle 210.

The network 280 may be any wired network, wireless network, or combination thereof, and may comprise the Internet in whole or in part. In addition, the network 280 may be a personal area network, local area network, wide area network, cable network, satellite network, cellular telephone network, or combination thereof. The network 280 may also be a publicly accessible network of linked networks, possibly operated by various distinct parties, such as the Internet. In some embodiments, the network 280 may be a private or semi-private network, such as a corporate or university intranet. The network 280 may include one or more wireless networks, such as a Global System for Mobile Communications (GSM) network, a Code Division Multiple Access (CDMA) network, a Long Term Evolution (LTE) network, or some other type of wireless network. Protocols and components for communicating via the Internet or any of the other aforementioned types of communication networks are well known to those skilled in the art of computer communications and thus, need not be described in more detail herein.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

The aerial vehicle 210 and/or the data processing system 270 may use any web-enabled or Internet applications or features, or any other client-server applications or features including E-mail or other messaging techniques, to connect to the network 280, or to communicate with one another, such as through short or multimedia messaging service (SMS or MMS) text messages. For example, the aerial vehicle 210 may be adapted to transmit information or data in the form of synchronous or asynchronous messages to the data processing system 270 or to any other computer device (e.g., to one or more other aerial vehicles) in real time or in near-real time, or in one or more offline processes, via the network 280. Those of ordinary skill in the pertinent art would recognize that the aerial vehicle 210 or the data processing system 270 may operate or be operated by any of a number of computing devices that are capable of communicating over the network, including but not limited to set-top boxes, personal digital assistants, digital media players, web pads, laptop computers, desktop computers, electronic book readers, and the like. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as the processor 212 or the processor 274, or any other computers or control systems utilized by the aerial vehicle 210 or the data processing system 270 (e.g., by one or more other aerial vehicles), and having sequences of instructions which, when executed by a processor (e.g., a central processing unit, or "CPU"), cause the processor to perform all or a portion of the functions, services and/or methods described herein. Such computer executable instructions, programs, software, and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage media of the present disclosure may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Figure 3:
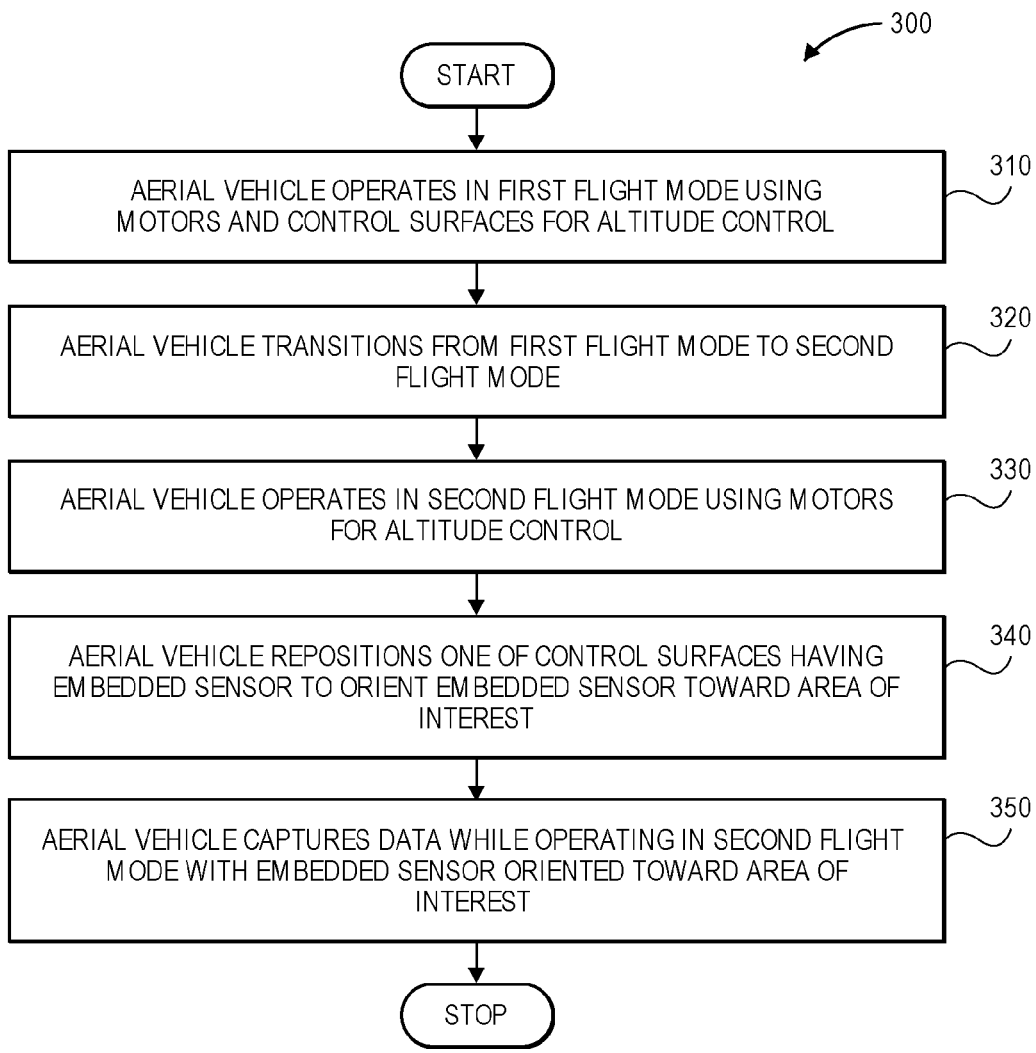
FIG. 3 is a flow chart of one process for operating an aerial vehicle having one or more sensors embedded within control surfaces in accordance with embodiments of the present disclosure.

As is discussed above, an aerial vehicle may include one or more directional sensors embedded within a movable control surface of an aerial vehicle, e.g., one or more wings, rudders, ailerons, elevators, flaps, brakes or slats, or other features of the aerial vehicle, which may be repositioned in order to orient the directional sensors in a direction or toward an area of interest. Referring to FIG. 3, a flow chart 300 of one process for operating an aerial vehicle having one or more sensors embedded within control surfaces in accordance with embodiments of the present disclosure is shown. At box 310, the aerial vehicle operates in a first flight mode using motors and control surfaces for altitude control. For example, the aerial vehicle may transit in a forward (or horizontal) flight mode using thrust generated by one or more rotating propellers, and may remain aloft due to lift generated by airflow over one or more wings or other airfoils, such as is shown in FIG. 1C or 1D. Alternatively, the aerial vehicle may travel vertically, such as from one altitude to another altitude, or hover, e.g., or remain at a substantially constant altitude.

At box 320, the aerial vehicle transitions from the first flight mode to a second flight mode. For example, the aerial vehicle may transition from a forward or horizontal flight mode to a vertical flight mode, or to a hovering flight mode. In this regard, the aerial vehicle may transition from obtaining lift force via airflow over wings or other airfoils, e.g., in a forward flight mode, to obtaining lift force via one or more rotating propellers, e.g., in a vertical flight mode or in a hovering mode, such as is shown in FIGS. 1E and 1F. At box 330, the aerial vehicle operates in the second flight mode using motors for altitude control. For example, the aerial vehicle may change its altitude, either to ascend or descend (such as in a takeoff or landing evolution), or may hover, in the second flight mode by varying the operating speeds of one or more lift motors, such as the motors 140-1, 140-2, 140-3, 140-4 of the aerial vehicle 110 of FIGS. 1A through 1F. Alternatively, the aerial vehicle may use one or more control surfaces in the second flight mode that are different than those that were used to operate the aerial vehicle in the first flight mode.

At box 340, the aerial vehicle repositions one of the control surfaces having an embedded sensor therein, in order to orient the embedded sensor toward an area of interest. For example, referring again to FIGS. 1E and 1F, the aerial vehicle 110 may approach the destination 165 associated with the customer 160, and may reposition one or more of the control surfaces 130-1, 130-2, 130-5, 130-6 to align one or more of the directional sensors 134-1, 134-2, 134-5, 134-6 in a substantially downwardly manner, in search for one or more fiducial markings identifying a landing area for the aerial vehicle 110. Alternatively, the aerial vehicle 110 may pivot one or more of the control surfaces 130-3, 130-4 to align one or more of the directional sensors 134-3, 134-4 in a substantially horizontal manner, e.g., to scan for airborne or ground-based objects about a perimeter of the aerial vehicle 110, in order to avoid a collision with any such objects.

At box 350, the aerial vehicle captures data using the embedded sensor oriented toward the area of interest while operating in the second flight mode, and the process ends. For example, using one or more imaging devices or other sensors embedded into control surfaces that are not required for operation in the second flight mode, the aerial vehicle may capture information or data and utilize such information or data for guidance, surveillance, collision avoidance or any other purpose. Alternatively, in some embodiments, the aerial vehicle may ultimately return to the first flight mode, and may utilize one or more sensors embedded within control surfaces that are not required for operation in the first flight mode to capture information or data in operation.

Figure 4A:
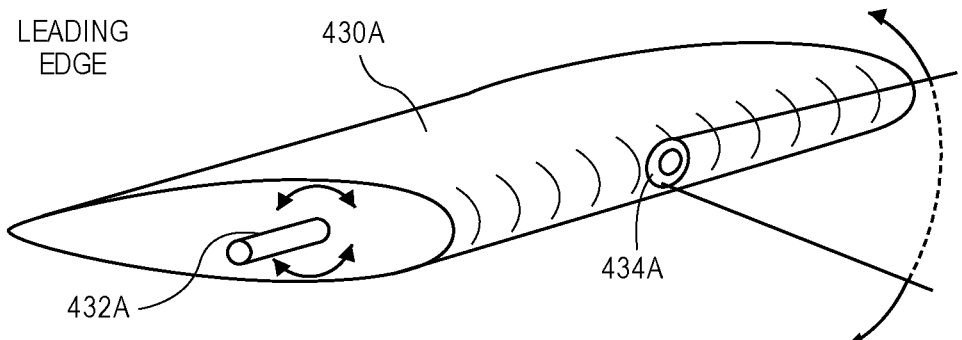
FIGS. 4A through 4C are views of aspects of control surfaces having one or more sensors embedded therein in accordance with embodiments of the present disclosure.
Figure 4B:
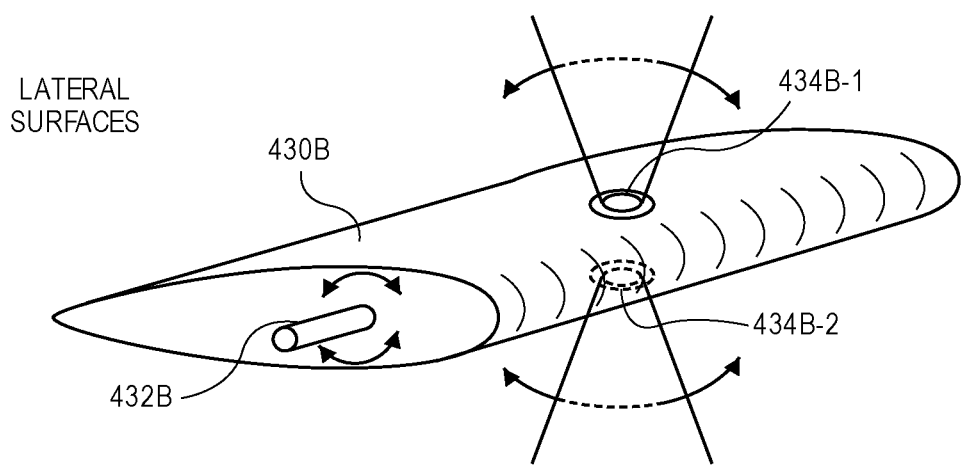
Figure 4C:
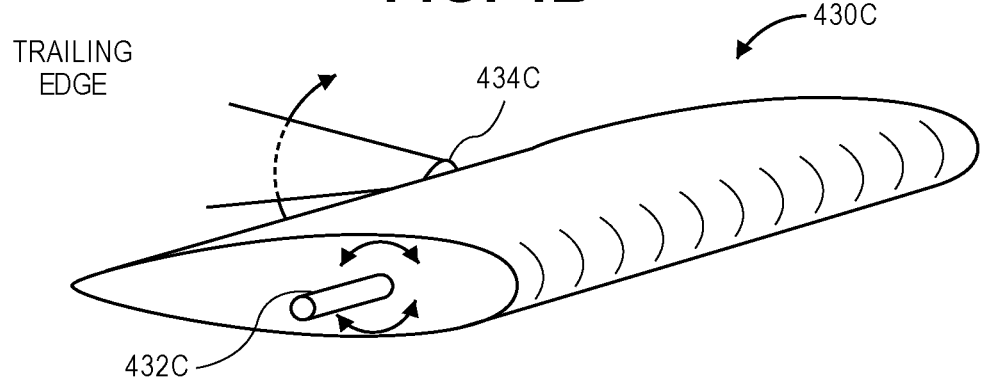

As is discussed above, a sensor may be embedded anywhere within a movable control surface in accordance with the present disclosure, including on one or more leading edges, trailing edges, tips, or any other faces or other portions of the movable control surface. Referring to FIGS. 4A, 4B and 4C, views of aspects of control surfaces having one or more sensors embedded therein in accordance with embodiments of the present disclosure are shown. Except where otherwise noted, reference numerals preceded by the number "4" shown in FIGS. 4A, 4B and 4C indicate components or features that are similar to components or features having reference numerals preceded by the number "2" shown in FIG. 2 or by the number "1" shown in FIGS. 1A through 1F.

As is shown in FIG. 4A, a horizontally aligned movable control surface 430A (e.g., an elevator, a flap, an aileron or another like surface) is configured to pivot about an axis 432A, and includes an imaging device 434A provided on a leading edge of the movable control surface 430A, such that a lens or other optical element extends through the leading edge. The imaging device 434A may be embedded in a manner such that a lens or covering thereof is smooth or flush with the leading edge of the movable control surface 430A and does not disrupt the aerodynamic qualities of the leading edge of the movable control surface 430A, or otherwise impede airflow thereover.

Moreover, the imaging device 434A may be embedded in a manner that maintains a density and/or weight distribution of the movable control surface 430A identical to the density and/or the weight distribution of the movable control surface 430A prior to embedding the imaging device 434A therein. For example, where the imaging device 434A occupies a particular volume within the surface and/or airfoil of the movable control surface 430A, mass (e.g., counterweights) may be added to or removed from the movable control surface 430A, as necessary, to ensure that the change in density and/or weight distribution resulting from the embedding of imaging device 434A therein does not adversely effect the movable control surfaces 430A or an aerial vehicle to which the movable control surface 430A is pivotably coupled. Likewise, mass may be added to or removed from a movable control surface that is a counterpart to the movable control surface 430A (e.g., located on an opposite side of an axis of orientation of the aerial vehicle), in order to ensure that the aerial vehicle remains mass-centered after the imaging device 434A is embedded therein.

Thus, when the movable control surface 430A is not required in order to safely operate an aerial vehicle, e.g., where the aerial vehicle to which the movable control surface 430A is joined is operating in a vertical flight mode, or a hovering mode, the movable control surface 430A may be pivoted about the axis 432A, e.g., clockwise or counterclockwise, and a field of view of the imaging device 434A will move upwardly or downwardly accordingly.

As is shown in FIG. 4B, another horizontally aligned movable control surface 430B is configured to pivot about an axis 432B, and includes a pair of imaging devices 434B-1, 434B-2 provided on a top lateral surface and a bottom lateral surface, respectively. The imaging devices 434B-1, 434B-2 may also be embedded within the top or bottom lateral surfaces such that lenses or coverings of the imaging devices 434B-1, 434B-2 are smooth or flush with the lateral surfaces and does not disrupt the aerodynamic qualities of the leading edge of the movable control surface 430B, or otherwise inhibit air flow passing over or under the movable control surface 430B, and does not alter a density, a weight distribution and/or a mass balance of the movable control surface 430B or an aerial vehicle to which the movable control surface 430B is pivotably coupled. As is shown in FIG. 4C, a third horizontally aligned movable control surface 430C is configured to pivot about an axis 432C, and includes an imaging device 434C embedded therein along a trailing edge of the movable control surface 430C, in a manner such that a lens or covering thereof is smooth or flush with the trailing edge and does not disrupt the aerodynamic qualities of the trailing edge of the movable control surface 430A, or otherwise impede airflow thereover.

In accordance with the present disclosure, an aerial vehicle having one or more control surfaces having directional sensors, e.g., imaging devices, embedded therein may be aligned at any angle, including but not limited to horizontal (or lateral from an aerial vehicle frame), vertical (or normal to the aerial vehicle frame), or any angle therebetween. The movable control surfaces of the present disclosure are not limited to the horizontally aligned movable control surfaces 430A, 430B, and 430C of FIGS. 4A, 4B and 4C. Moreover, the directional sensors may be any type or form of sensing device configured to capture imaging data along a particular axis or direction, and need not be limited to the imaging devices 434A, 434B-1, 434B-2, 434C of FIGS. 4A, 4B and 4C.

Figure 5A:
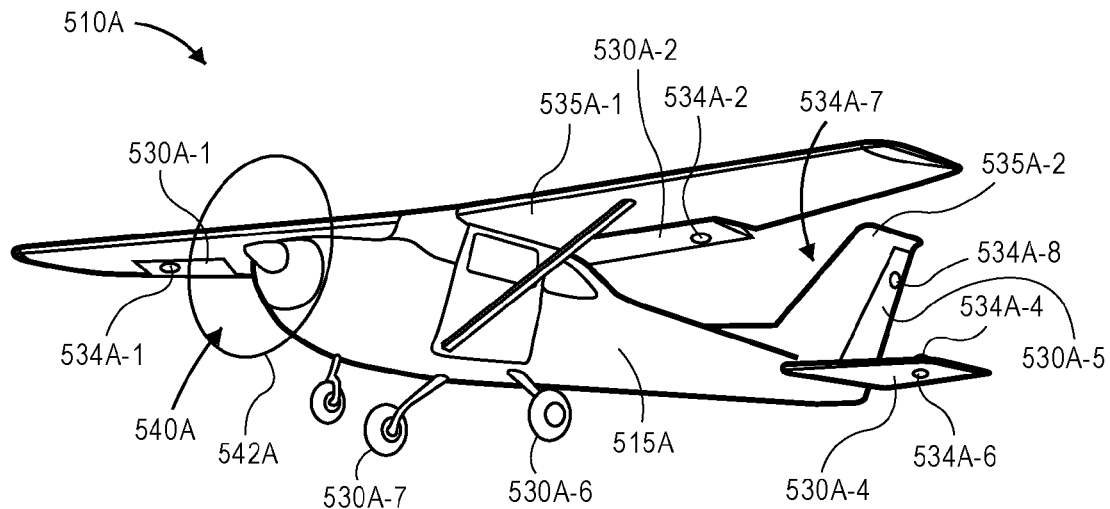
FIGS. 5A and 5B are views of aspects of aerial vehicles having one or more sensors embedded within in accordance with embodiments of the present disclosure.
Figure 5B:
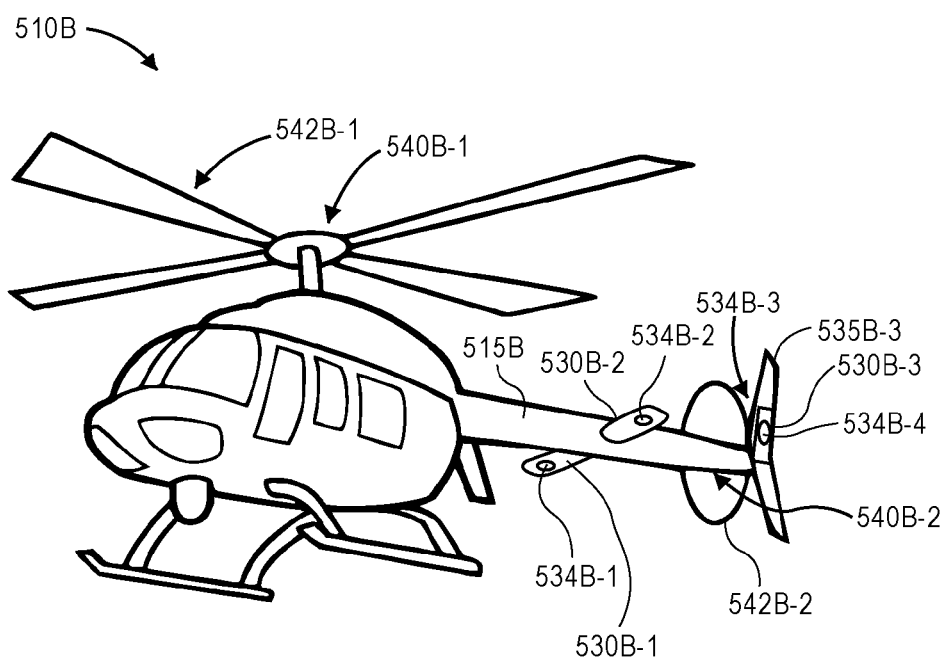

Additionally, directional sensors may be embedded within control surfaces of any type or form in accordance with the present disclosure, and on any type of aircraft. Referring to FIGS. 5A and 5B, views of aspects of aerial vehicles having one or more sensors embedded within control surfaces in accordance with embodiments of the present disclosure are shown. Except where otherwise noted, reference numerals preceded by the number "5" shown in FIG. 5A or 5B indicate components or features that are similar to components or features having reference numerals preceded by the number "4" shown in FIG. 4A, 4B or 4C, by the number "2" shown in FIG. 2 or by the number "1" shown in FIGS. 1A through 1F.

As is shown in FIG. 5A, a manned airplane 510A is shown. The manned airplane 510A includes a fixed wing 535A-1, a fixed vertical stabilizer 535A-2, a pair of movable elevators, a motor 540A and retractable landing gear 530A-6, 530A-7 mounted to a frame 515. The fixed wing 535A-1 includes a pair of movable ailerons 530A-1, 530A-2 on trailing edges of port and starboard sides, respectively, of the fixed wing 535A-1. The fixed vertical stabilizer 535A-2 includes a movable rudder 530A-5 on a trailing edge. A starboard movable elevator provided on a starboard side of the manned airplane 510A is not visible in FIG. 5A, while a port movable elevator 530A-4 is shown in FIG. 5A on a port side of the manned airplane 510A. The motor 540A is mechanically coupled to and configured to rotate a propeller 542A, at sufficient operating speeds to create desired amounts of thrust and/or lift for operating the manned airplane 510A.

Additionally, the manned airplane 510A further includes a plurality of directional sensors 534A-1, 534A-2, 534A-4, 534A-6, 534A-7, 534A-8 (e.g., digital cameras or other imaging devices, radar sensors, laser sensors) disposed thereon. As is shown in FIG. 5A, the manned airplane 510A includes directional sensors 534A-1, 534A-2 provided on undersides of the movable ailerons 530A-1, 530A-2, directional sensors 534A-4, 534A-6 provided on top and bottom surfaces of the port movable elevator 530A-4, and directional sensors 534A-8, 534A-7 provided on port and starboard sides of the movable rudder 530A-5. Thus, during operation, one or more of the movable control surfaces, e.g., the ailerons 530A-1, 530A-2, the elevator 530A-4, or the rudder 530A-5, may be repositioned or reoriented, as necessary, to change an axis of orientation or field of view of the respective directional sensors 534A-1, 534A-2, 534A-4, 534A-6, 534A-7, 534A-8, for any purpose.

In accordance with the present disclosure, directional sensors may be provided on other elements or components of the manned airplane 510A, including but not limited to fixed elements or other movable components. For example, one or more imaging devices or other directional sensors may be embedded into external surfaces of the landing gear 530A-6, 530A-7, which may be raised or lowered, as necessary, to land the manned airplane 510A or upon takeoff, or to reposition any imaging devices or other directional sensors embedded therein. Additionally, one or more imaging devices or other directional sensors may be embedded into one or more blades of the propeller 542A, which may be rotated to a selected angular alignment in order to align such imaging devices or directional sensors, as desired. Furthermore, where the propeller 542A is a variable pitch propeller, both the angular alignment and a pitch angle of an imaging device or other directional sensor embedded therein may be modified accordingly, in order to align the imaging device or directional sensor accordingly. The manned airplane 510A may further include one or more lights or other addressable illuminators (not shown). Such lights or addressable illuminators may be mounted in fixed positions or orientations on the manned airplane 510A, or on one or more of the movable control surfaces thereon, e.g., the ailerons 530A-1, 530A-2, the elevator 530A-4, or the rudder 530A-5.

As is shown in FIG. 5B, a manned helicopter 510B is shown. The manned helicopter 510B includes a tail boom 515B and a main motor 540B-1. The tail boom 515B includes port and starboard movable elevators 530B-2, 530B-1, a vertical stabilizer 535B-3 and a tail motor 540B-2. The main motor 540B-1 and the tail motor 540B-2 are mechanically coupled to and configured to rotate a main rotor 542B-1 and a tail rotor 542B-2, respectively, at sufficient operating speeds. The vertical stabilizer 535B-23 includes a movable rudder 530B-3 provided on a trailing edge thereof. Additionally, the manned helicopter 510B further includes a plurality of directional sensors 534B-1, 534B-2, 534B-3, 534B-4, including directional sensors 534B-2, 534B-1 provided on the undersides of the port and starboard movable elevators 530B-2, 530B-1, directional sensors 534B-4, 534B-3 provided on port and starboard sides of the movable rudder 530B-3. Alternatively, the manned helicopter 510B may include any number of other imaging devices or other directional sensors embedded into external surfaces thereof, as well as one or more lights or other addressable illuminators (not shown).

As is discussed above, directional sensors may be repositioned or reoriented using the same motors, controllers or other components for repositioning or reorienting the movable control surfaces into which such sensors are embedded, in accordance with the present disclosure. Such motors, controllers or other components may be configured to operate in different manners or subject to different restrictions or limitations, depending on whether the movable control surfaces are being operated for flight control, e.g., to increase or decrease forces of lift on an aerial vehicle, or to change a yaw, a pitch or a roll of the aerial vehicle. For example, in some embodiments, a wing, a rudder, an aileron or a flap may be limited to a first predetermined angular range or extent within which the wing, the rudder, the aileron or the flap may rotate or pivot during operation, and a second (e.g., broader) predetermined angular range or extent within which the wing, the rudder, the aileron or the flap may rotate or pivot while repositioning or reorienting a directional sensor embedded therein. The wing, the rudder, the aileron or the flap may be rotated or pivoted to a broader extent where the wing, the rudder, the aileron or the flap is not required in order to maintain positive control over the aerial vehicle while the directional sensor is in use.

Figure 6A:
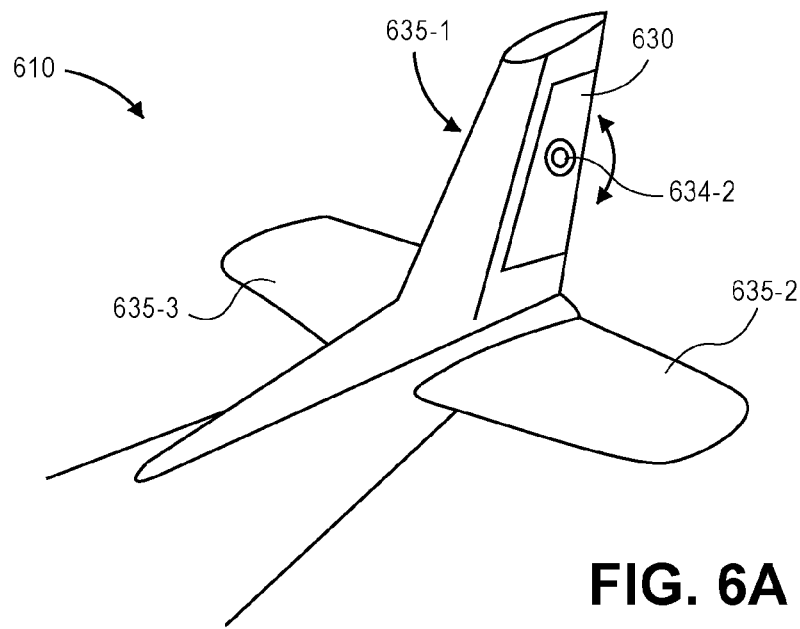
FIGS. 6A and 6B are views of aspects of one aerial vehicle having one or more sensors embedded within in accordance with embodiments of the present disclosure.
Figure 6B:
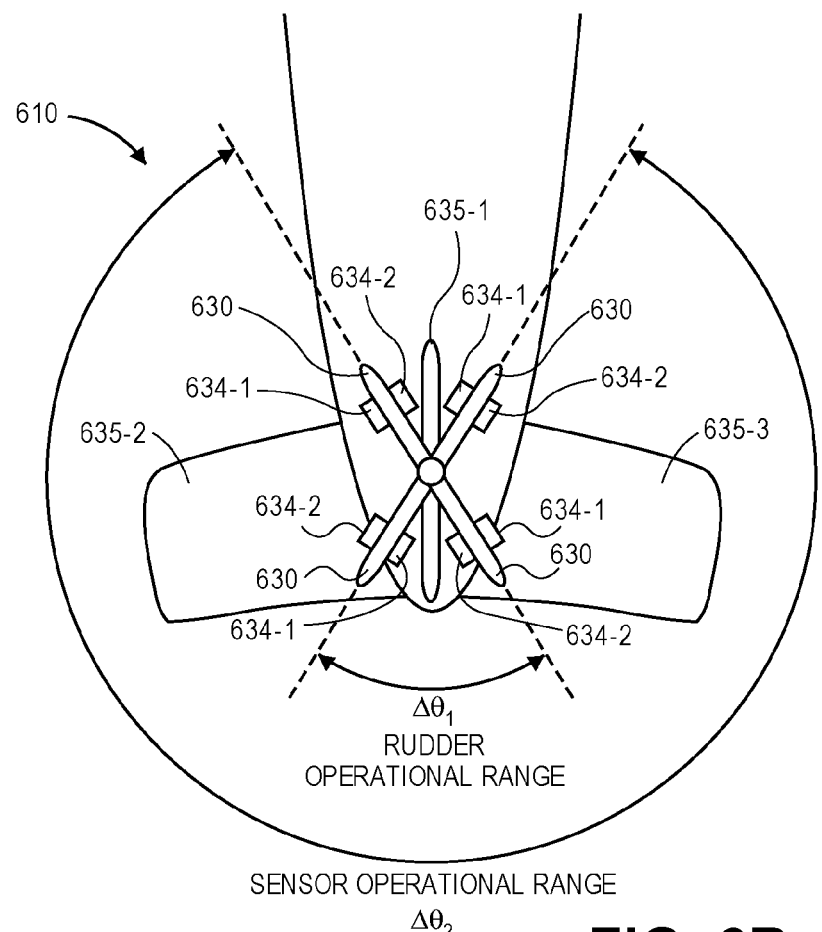

Referring to FIGS. 6A and 6B, views of aspects of one aerial vehicle having one or more sensors embedded within in accordance with embodiments of the present disclosure are shown. Except where otherwise noted, reference numerals preceded by the number "6" shown in FIG. 6A or 6B indicate components or features that are similar to components or features having reference numerals preceded by the number "5" shown in FIG. 5A or 5B, by the number "4" shown in FIG. 4A, 4B or 4C, by the number "2" shown in FIG. 2 or by the number "1" shown in FIGS. 1A through 1F.

As is shown in FIGS. 6A and 6B, an aerial vehicle 610 includes a fixed vertical stabilizer 635-1 and port and starboard fixed horizontal stabilizers 635-2, 635-3. Additionally, the fixed vertical stabilizer 635-1 includes a movable rudder 630 on a trailing edge thereof, with port and starboard directional sensors 634-2, 634-1 provided on respective sides of the movable rudder 630.

As is shown in FIG. 6B, during operation of the aerial vehicle 610, the movable rudder 630 may be repositioned within a first operational range $\Delta\theta_1$, e.g., where the movable rudder 630 is relied upon for fine steering control. During use of the directional sensors 634-2, 634-1, the movable rudder 630 may be repositioned within a second operational range $\Delta\theta_2$, e.g., where the movable rudder 630 is relied upon for repositioning the respective directional sensors 634-2, 634-1. As is shown in FIG. 6B, the second operational range $\Delta\theta_2$ is significantly wider than the first operational range $\Delta\theta_1$, given the fact the rudder 630 need only be repositioned to a narrow extent in order to vary a yaw of the aerial vehicle 610 in flight, while the rudder 630 may be repositioned to any extent, subject to physical or operational limits, if needed to reposition the respective directional sensors 634-2, 634-1, e.g., while the aerial vehicle 610 is taxiing or performing other non-flight evolutions.

The systems and methods of the present disclosure are particularly useful in takeoff and landing evolutions, such as where a multi-modal UAV transitions from a forward flight mode to a vertical flight mode (or hovering flight mode). For example, where wings, rudders, ailerons, elevators, flaps, brakes or slats are not required to operate the multi-modal UAV in a safe manner, imaging devices or other directional sensors embedded within such wings, rudders, ailerons, elevators, flaps, brakes or slats may be used to scan in vertical and/or horizontal directions for clearance to land or take off, or for one or more hazards that may exist, or might exist, within an intended flight path of the multi-modal UAV.

Referring to FIGS. 7A through 7D, views of aspects of one system including an aerial vehicle having one or more sensors embedded within control surfaces in accordance with embodiments of the present disclosure are shown. Except where otherwise noted, reference numerals preceded by the number "7" shown in FIGS. 7A through 7D indicate components or features that are similar to components or features having reference numerals preceded by the number "6" shown in FIG. 6A or 6B, by the number "5" shown in FIG. 5A or 5B, by the number "4" shown in FIG. 4A, 4B or 4C, by the number "2" shown in FIG. 2 or by the number "1" shown in FIGS. 1A through 1F.

Figure 7A:
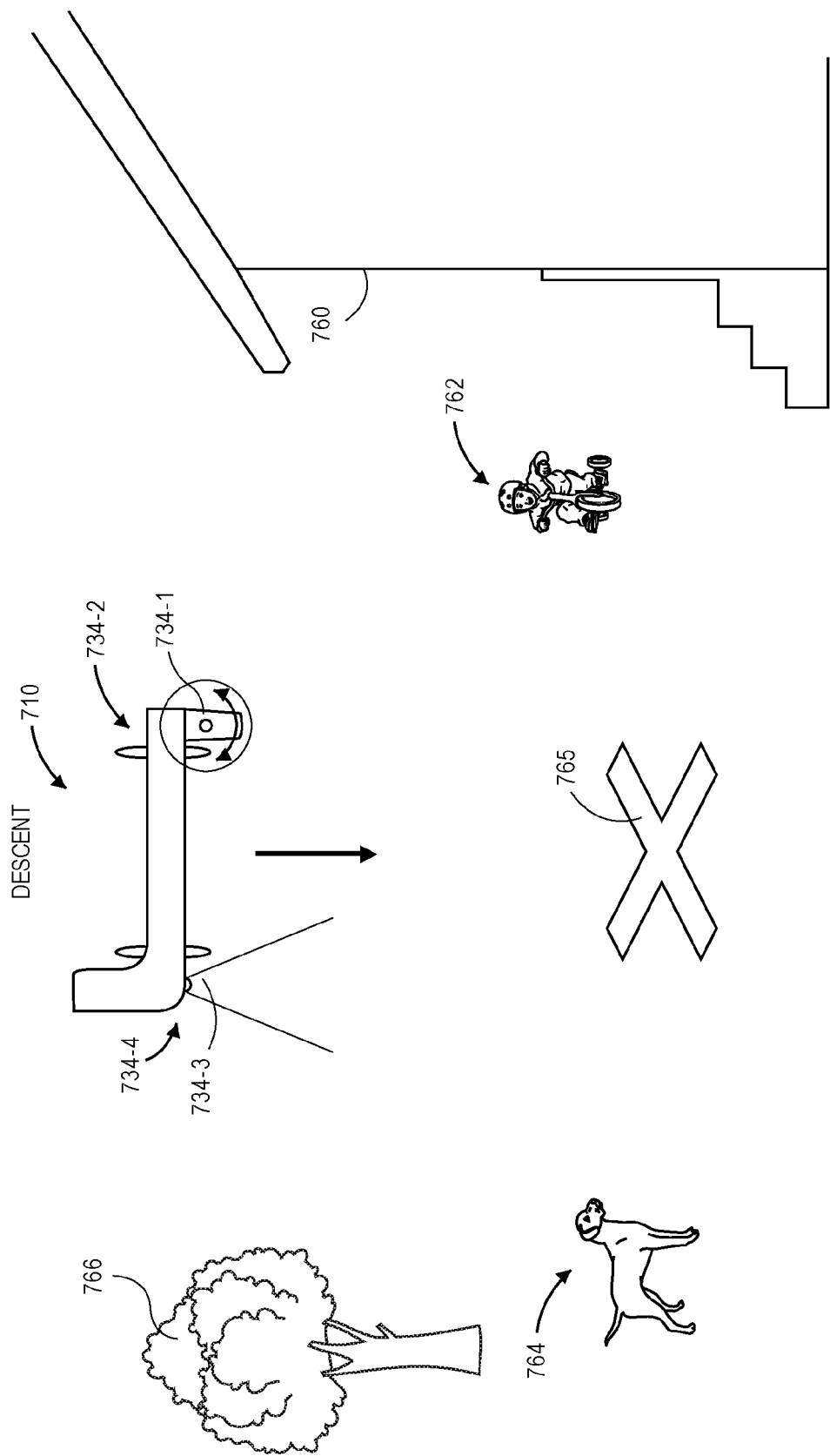
Figure 7B:
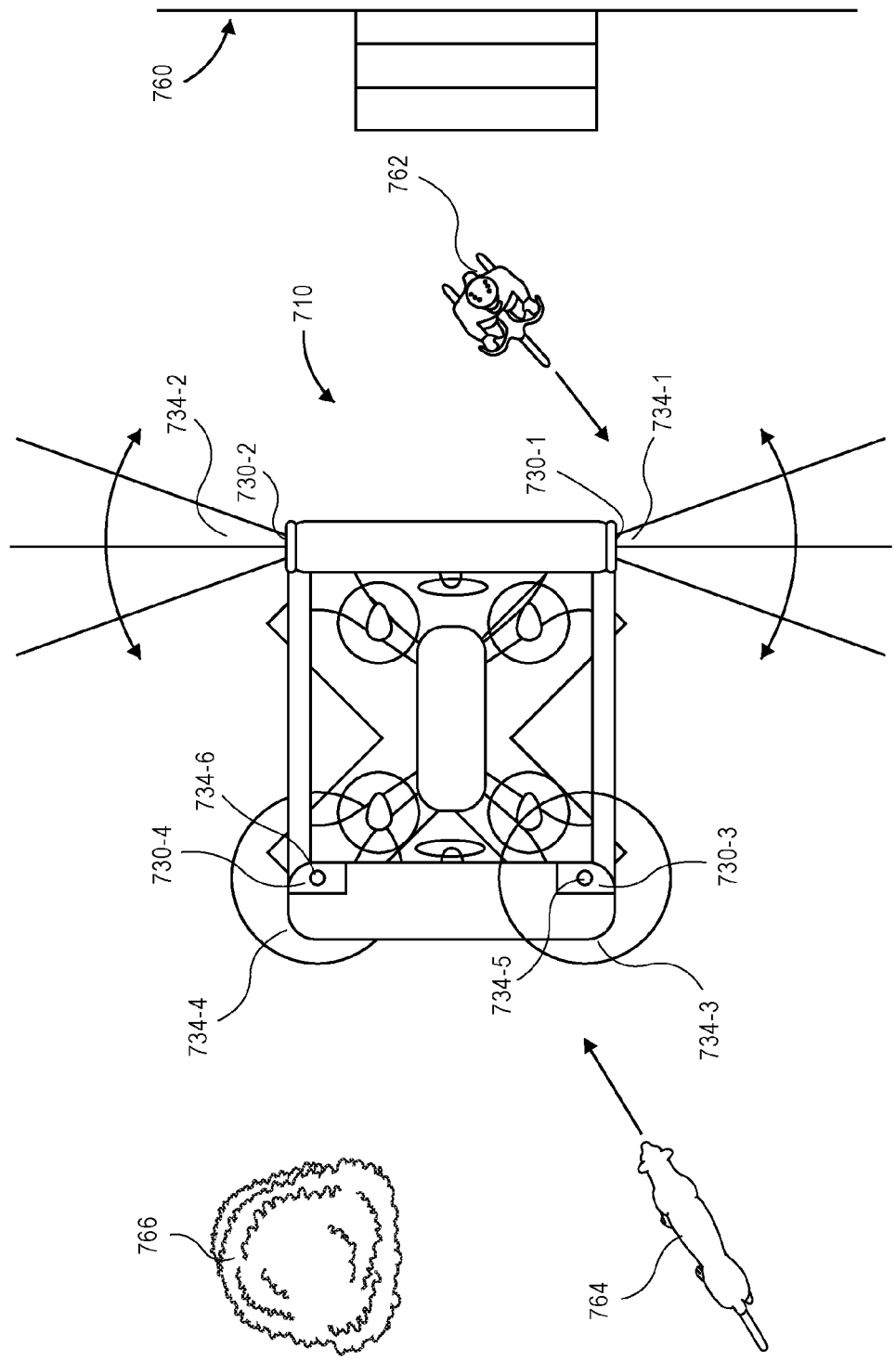

As is shown in FIGS. 7A and 7B, an aerial vehicle 710 descends toward a destination 765 associated with a customer 760. In or around the destination 765, a person 762 (e.g., a child on a tricycle) and an animal 764 (e.g., a dog) are on the ground, and a tree 766 is nearby. During the descent, in which movable control surfaces such as wings, rudders, ailerons, elevators, flaps, brakes or slats are not required for safe operation or to maintain altitude, the aerial vehicle 710 may operate one or more downwardly oriented imaging devices 734-3, 734-4 embedded on lower surfaces of pivotable elevators 730-3, 730-4, or one or more horizontally oriented imaging devices 734-1, 734-2 embedded on lateral surfaces of pivotable winglets 730-1, 730-2 to evaluate the destination 765, e.g., by searching for a fiducial marking of any kind, or to confirm that the destination 765 is clear of obstacles or other hazards, including but not limited to the person 762, the dog 764 or the tree 766. As is shown in FIG. 7B, as the aerial vehicle 710 descends, the person 762 or the dog 764 may be tracked on the ground using the downwardly oriented imaging devices 734-3, 734-4, e.g., by repositioning the pivotable elevators 730-3, 730-4, as necessary. Likewise, the horizontally oriented imaging devices 734-1, 734-2 may be used to scan a perimeter or surroundings of the aerial vehicle 710 as the aerial vehicle descends, in order to confirm that any obstacles or other hazards, such as the person 762, the dog 764 or the tree 766, or one or more other aerial vehicles, are neither approaching the aerial vehicle 710 nor within a flight path thereof.

Figure 7D:
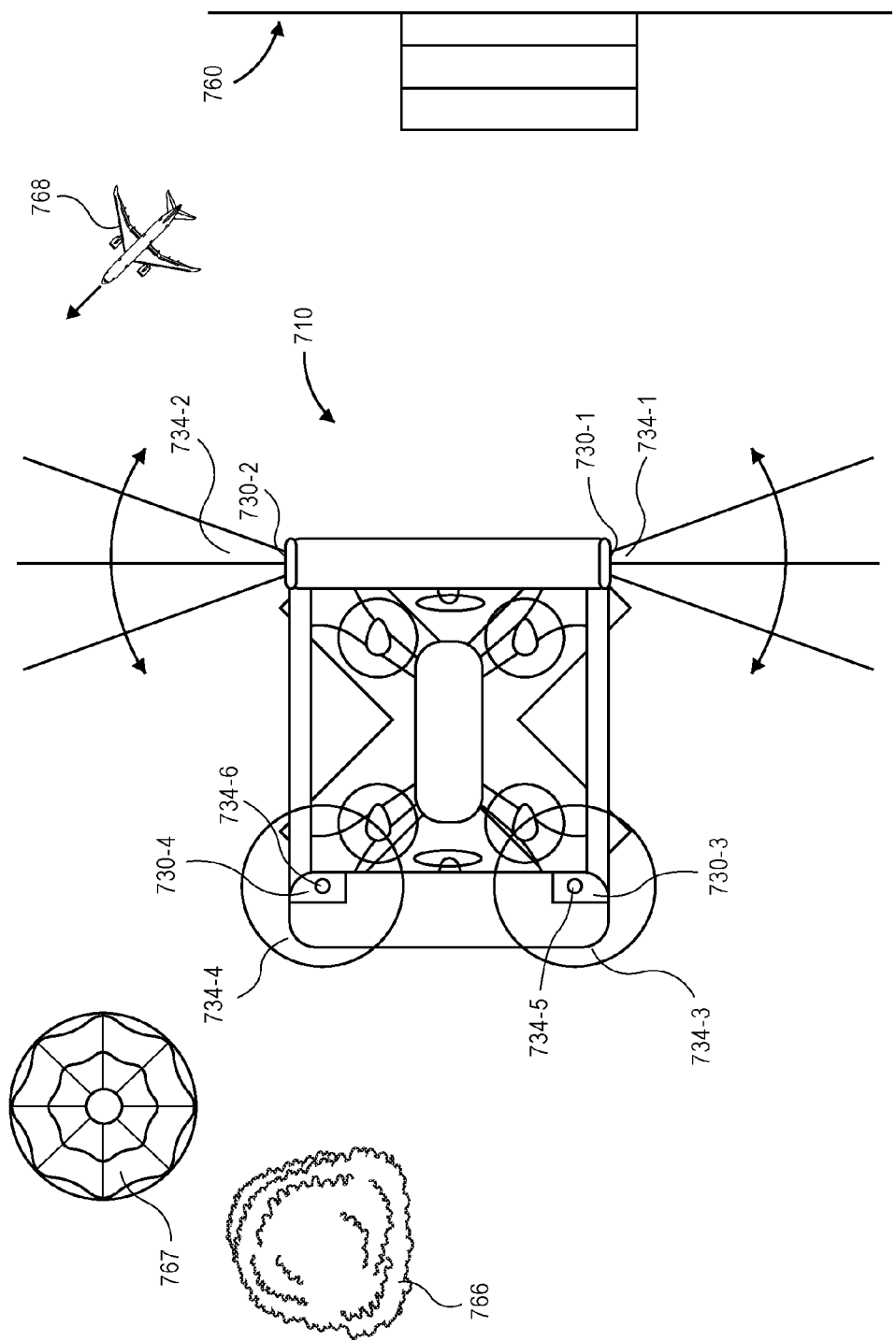

As is shown FIGS. 7C and 7D, the aerial vehicle 710 ascends from the destination 765, e.g., after completing a mission. In or around the destination 765, a hot air balloon 767 and a jumbo jet 768 are aloft. During the ascent, in which movable control surfaces such as wings, rudders, ailerons, elevators, flaps, brakes or slats are not required for safe operation, the aerial vehicle 710 may operate one or more upwardly oriented imaging devices 734-5, 734-6 embedded on upper surfaces of the pivotable elevators 730-3, 730-4, or the one or more horizontally oriented imaging devices 734-1, 734-2 embedded on the lateral surfaces of the pivotable winglets 730-1, 730-2 to search for potentially intersecting traffic at a predetermined altitude (e.g., a cruising altitude) where the aerial vehicle 710 intends to operate, and confirm that the area above the aerial vehicle 710 at the predetermined altitude is clear of obstacles or other hazards, including but not limited to the balloon 767 or the jumbo jet 768. As is shown in FIG. 7D, as the aerial vehicle 710 ascends, the balloon 767 or the jumbo jet 768 may be tracked in the air using the upwardly oriented imaging devices 734-5, 734-6, e.g., by repositioning the pivotable elevators 730-3, 730-4, as necessary. Likewise, the horizontally oriented imaging devices 734-1, 734-2 may be used to scan a perimeter or surroundings of the aerial vehicle 710 as the aerial vehicle ascends, in order to avoid the tree 766, the balloon 767 or the jumbo jet 768, or to confirm that any other obstacles or hazards, such as one or more other aerial vehicles, are neither approaching the aerial vehicle 710 nor within an upward flight path thereof.

As is discussed above, aerial vehicles of the present disclosure may be outfitted with fixed or mobile addressable illuminators, e.g., lights, that may be selectively operated in concert with one or more fixed or mobile imaging devices in order to obtain desired lighting conditions within fields of view of such imaging devices, and enhance the quality of imaging data captured thereby. Such illuminators may be provided on the aerial vehicle for any purpose, e.g., as safety lights, running lights or normal operating lights, and co-opted, as necessary, to achieve the desired lighting conditions. The illuminators may be configured to emit light of any color, frequency or wavelength, and may be of any type or form.

Figure 8:
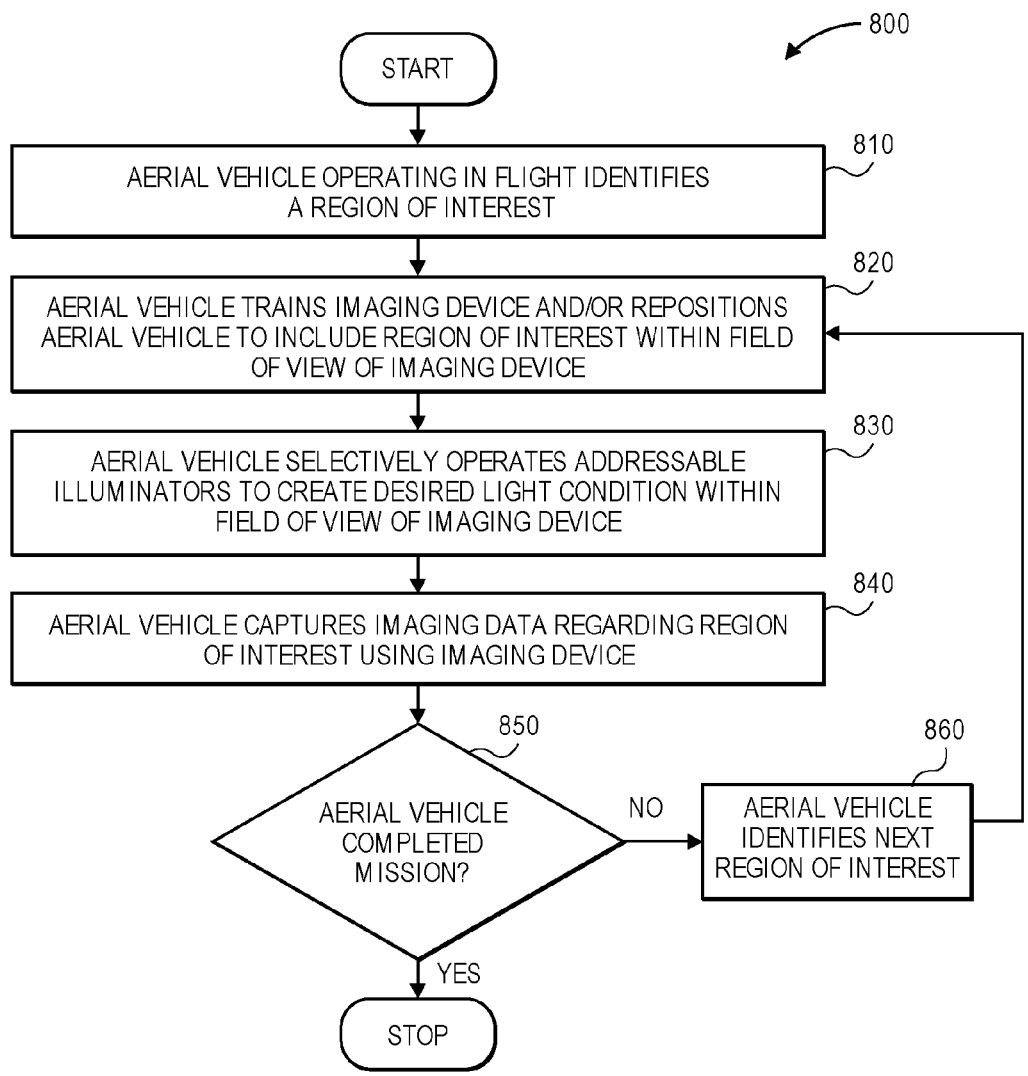
FIG. 8 is a flow chart of one process for operating an aerial vehicle having one or more addressable illuminators and imaging devices in accordance with embodiments of the present disclosure.

Referring to FIG. 8, a flow chart 800 of one process for operating an aerial vehicle having one or more addressable illuminators and imaging devices in accordance with embodiments of the present disclosure is shown. At box 810, the aerial vehicle, operating in flight, identifies a region of interest. For example, the aerial vehicle may be conducting a delivery, and may identify one or more attributes of a destination, one or more indicators of an approaching aerial vehicle, or any other element. The region of interest may be identified by any means, including but not limited to image recognition, radar, laser or other techniques, or based on one or more sets of instructions. At box 820, the aerial vehicle trains an imaging device and/or repositions itself to include the region of interest within a field of view. For example, the imaging device may be embedded in one or more movable control surfaces of the aerial vehicle that is not used for operation in the first flight mode, and the aerial vehicle may reposition or reorient the movable control surfaces as necessary in order to align a lens of the aerial vehicle toward the region of interest. The imaging device may be mounted to the aerial vehicle by one or more rotatable or repositionable mounts, and may be independently repositioned in order to cause the region of interest to appear within a field of view thereof. Alternatively, the aerial vehicle may be reoriented to cause the region of interest to appear within a field of view of the imaging device.

At box 830, the aerial vehicle selectively operates one or more addressable illuminators to create a desired lighting condition within the field of view of the imaging device. For example, the aerial vehicle may operate one or more safety lights, running lights or normal operating lights at maximum capacity, in order to cast a maximum amount of illumination toward the region of interest. Alternatively, one or more of the addressable illuminators may be configured to emit light in a predetermined color or at a predetermined frequency or wavelength, as desired, depending on an operational requirement of the aerial vehicle. Any level of light, in any color and at any frequency or wavelength, may be emitted by the addressable illuminators in accordance with the present disclosure. At box 840, the aerial vehicle captures imaging data regarding the region of interest regarding the imaging device.

At box 850, where the aerial vehicle has completed its mission is determined. If the aerial vehicle has completed its mission, the process ends. If the aerial vehicle has not completed its mission, however, then the process advances to box 860, where the aerial vehicle identifies another region of interest, before returning to box 820, where the aerial vehicle trains the imaging device and/or repositions itself to include the newly identified region of interest in a field of view.

Figure 9A:
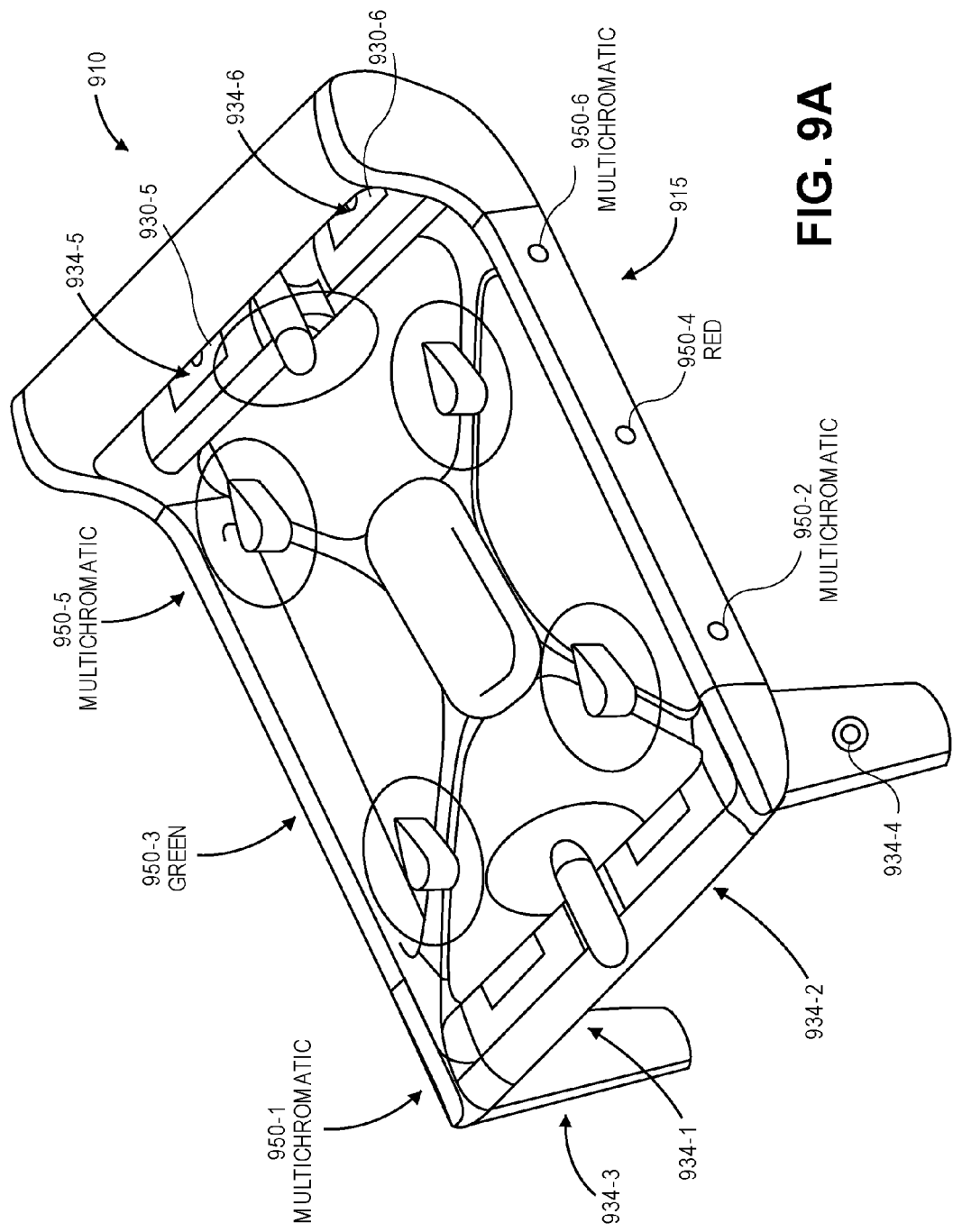
Figure 9B:
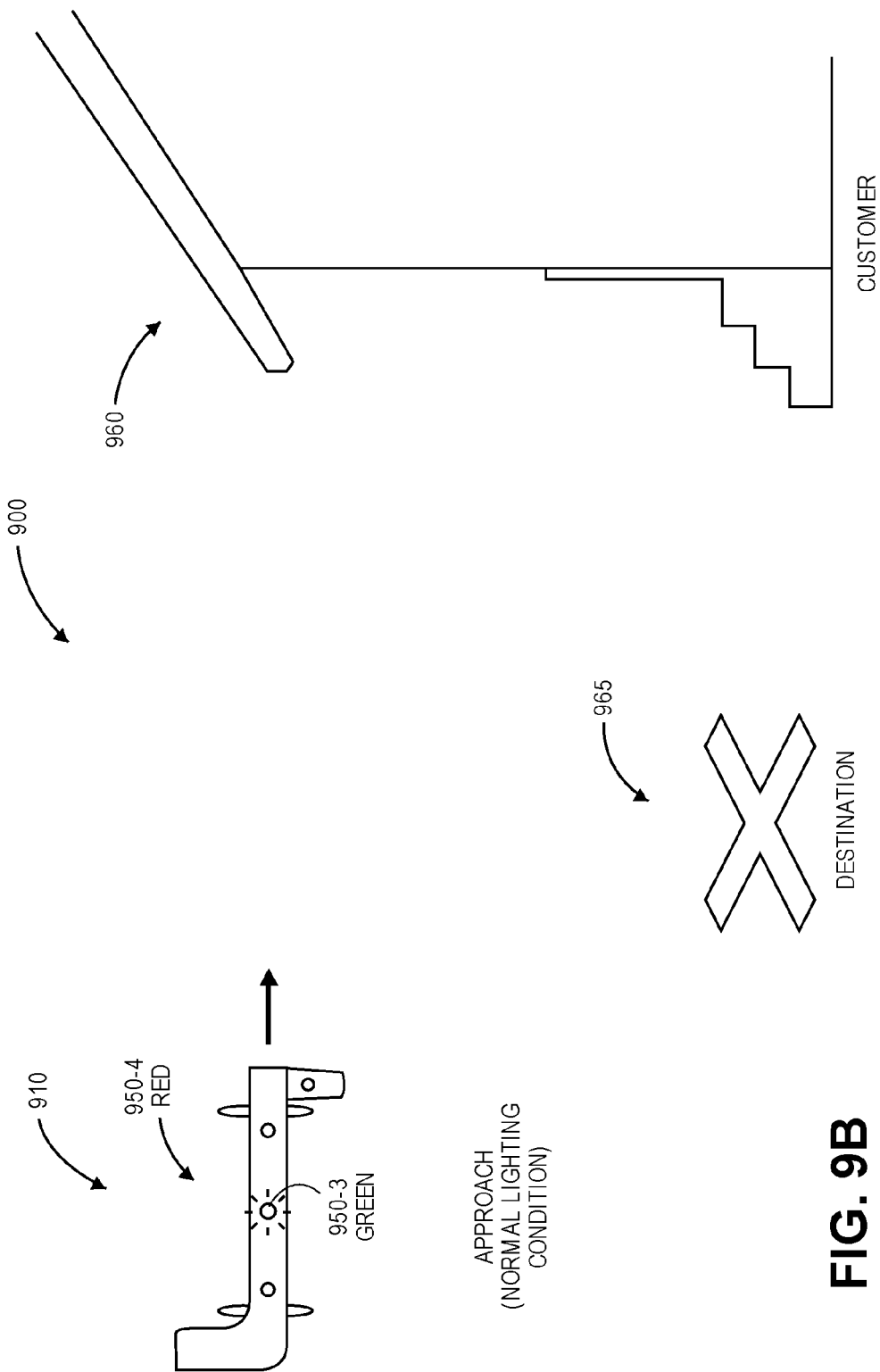

Referring to FIGS. 9A through 9C, views of aspects of one aerial vehicle having one or more addressable illuminators and imaging devices in accordance with embodiments of the present disclosure are shown. Except where otherwise noted, reference numerals preceded by the number "9" in FIG. 9A, 9B or 9C indicate components or features that are similar to components or features having reference numerals preceded by the number "7" shown in FIGS. 7A through 7D, by the number "6" shown in FIG. 6A or 6B, by the number "5" shown in FIG. 5A or 5B, by the number "4" shown in FIG. 4A, 4B or 4C, by the number "2" shown in FIG. 2 or by the number "1" shown in FIGS. 1A through 1F.

As is shown in FIG. 9A, an aerial vehicle 910 includes a frame 915, a plurality of movable control surfaces 930-1, 930-2, 930-3, 930-4, 930-5, 930-6 rotatably or pivotably mounted to the frame 915, a plurality of imaging devices 934-1, 934-2, 934-3, 934-4, 934-5, 934-6 embedded within the movable control surfaces 930-1, 930-2, 930-3, 930-4, 930-5, 930-6, and a plurality of addressable illuminators 950-1, 950-2, 950-3, 950-4, 950-5, 950-6 disposed about a perimeter of the aerial vehicle 910. For example, the movable control surfaces 930-1, 930-2 are ailerons provided in a forward section of the aerial vehicle 910, with the imaging devices 934-1, 934-2 embedded within undersides of the ailerons. The movable control surfaces 930-3, 930-4 are pivotable winglets provided in the forward section of the aerial vehicle 910, with the imaging devices 934-3, 934-4 embedded within outboard sides of the ailerons. The movable control surfaces 930-5, 930-6 are elevators provided in a rear section of the aerial vehicle 910, with the imaging devices 934-5, 934-6 embedded in upper sides of the elevators.

As is also shown in FIG. 9A, a port side of the frame 915 includes a multichromatic light 950-2 near a bow of the aerial vehicle 910, a red running light 950-4, and a multichromatic light 950-6 near a stern of the aerial vehicle 910. As is further shown in FIG. 9A, a starboard side of the frame 915 includes a multichromatic light 950-1 near the bow of the aerial vehicle 910, a green running light 950-3, and a multichromatic light 950-5 near the stern of the aerial vehicle 910.

As is shown in FIGS. 9B and 9C, the aerial vehicle 910 may operate one or more of the addressable illuminators 950-1, 950-2, 950-3, 950-4, 950-5, 950-6, as needed, depending on a mode of operation of the aerial vehicle 910, or whether the capture of imaging data using one or more of the imaging devices 934-1, 934-2, 934-3, 934-4, 934-5, 934-6 is desired or required. For example, as is shown in FIG. 9B, as the aerial vehicle 910 approaches a destination 965 associated with a customer 960, the addressable illuminators 950-1, 950-2, 950-3, 950-4, 950-5, 950-6 of the aerial vehicle 910 may be operated in a normal lighting condition, with the green running light 950-3 and the red running light 950-4 lit, and the multichromatic lights 950-1, 950-2, 950-5, 950-6 not lit. As is shown in FIG. 9C, as the aerial vehicle 910 descends upon the destination 965, the green running light 950-3 and the red running light 950-4 may be turned off, and the multichromatic lights 950-1, 950-2, 950-5, 950-6 may be energized in order to maximize the light available in a vicinity of the destination 965, thereby permitting the aerial vehicle 910 to rely on imaging data captured by one or more of the downwardly oriented imaging devices 934-1, 934-2, the horizontally oriented imaging devices 934-3, 934-4 or the upwardly oriented imaging devices 934-5, 934-6 when approaching the destination 965. After the aerial vehicle 910 has completed a mission, or is otherwise cleared to depart from the destination, the addressable illuminators 950-1, 950-2, 950-3, 950-4, 950-5, 950-6 of the aerial vehicle 910 may be operated in another lighting condition, as necessary.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

As used herein, the terms "forward" flight or "horizontal" flight refer to flight in a direction substantially parallel to the ground (i.e., sea level). As used herein, the term "vertical" flight refers to flight in a direction extending substantially radially outward from a center of the Earth. Those of ordinary skill in the pertinent arts will recognize that flight trajectories may include components of both "forward" flight or "horizontal" flight and "vertical" flight vectors.

Although some of the embodiments disclosed herein reference the use of unmanned aerial vehicles to deliver payloads from warehouses or other like facilities to customers, those of ordinary skill in the pertinent arts will recognize that the systems and methods disclosed herein are not so limited, and may be utilized in connection with any type or form of aerial vehicle (e.g., manned or unmanned) having fixed or rotating wings for any intended industrial, commercial, recreational or other use.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the processes represented in the flow charts of FIG. 3 or 8, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. An unmanned aerial vehicle comprising:
   at least a first motor aligned to provide thrust to the unmanned aerial vehicle;
   at least a second motor aligned to provide lift to the unmanned aerial vehicle;
   a first wing having a first movable control surface, wherein the first wing is aligned to provide lift to the unmanned aerial vehicle during operation of at least the first motor, and wherein a first digital camera having a first lens is embedded within the first movable control surface; and
   a control unit having at least one computer processor configured to at least:
      cause a first operation of the unmanned aerial vehicle in a first flight mode, wherein causing the first operation of the unmanned aerial vehicle in the first flight mode comprises:
         operating at least the first motor; and
         maintaining altitude control of the unmanned aerial vehicle using at least the first movable control surface;
      cause a second operation of the unmanned aerial vehicle in a second flight mode, wherein causing the second operation of the unmanned aerial vehicle in the second flight mode comprises:
         operating at least the second motor;
         stopping the first motor; and
         maintaining altitude control of the unmanned aerial vehicle using at least the second motor;

reposition the first movable control surface to align the first lens of the first digital camera toward a region of interest, wherein the first movable control surface is repositioned while the unmanned aerial vehicle operates in the second flight mode; and capture imaging data regarding the region of interest using the first digital camera.

2. The unmanned aerial vehicle of claim 1, further comprising at least one position sensor,
wherein the control unit is further configured to at least:
determine that the unmanned aerial vehicle is located within a vicinity of a first ground position by the at least one position sensor,
wherein the second operation of the unmanned aerial vehicle in the second flight mode is caused in response to determining that the unmanned aerial vehicle is located within the vicinity of the first ground position.

3. The unmanned aerial vehicle of claim 1, wherein the first movable control surface is one of a first aileron, a first flap or a first elevator.

4. The unmanned aerial vehicle of claim 1, wherein the first lens is disposed on at least one of a leading edge, a trailing edge, a top face or a bottom face of the first movable control surface.

5. The unmanned aerial vehicle of claim 1, further comprising at least one safety light,
wherein the control unit is further configured to at least:
illuminate the at least one safety light at or before a first time; and
capture the imaging data regarding the region of interest using the first digital camera at the first time.

6. A method comprising:
operating an aerial vehicle in a first flight mode, wherein the aerial vehicle comprises a control surface having a directional sensor embedded therein;
moving the control surface from a first position to a second position, wherein the directional sensor is aligned along a first axis of interest in the second position; and
capturing data along the first axis of interest using the directional sensor.

7. The method of claim 6, wherein the first flight mode is one of a substantially vertical flight mode or a substantially hovering flight mode, and wherein the method further comprises:
prior to operating the aerial vehicle in the first flight mode, operating the aerial vehicle in a second flight mode, wherein the second flight mode is a forward flight mode, and wherein at least one of a course, an altitude, a yaw, a pitch or a roll of the aerial vehicle is maintained by operation of the control surface in the second flight mode.

8. The method of claim 7, wherein the aerial vehicle further comprises a first motor and a second motor,
wherein operating the aerial vehicle in the first flight mode comprises operating at least the first motor mechanically coupled to a first rotor to supply a lifting force to the aerial vehicle, and
wherein operating the aerial vehicle in the second flight mode comprises operating at least the second motor mechanically coupled to a second rotor to supply a thrusting force to the aerial vehicle.

9. The method of claim 7, wherein the aerial vehicle further comprises a position sensor, and
wherein the method further comprises:
determining, with the aerial vehicle operating in the second flight mode, that the aerial vehicle is within a vicinity of a ground position by the position sensor; and
operating the aerial vehicle in the first flight mode in response to determining that the aerial vehicle is within the vicinity of the ground position.

10. The method of claim 6, wherein the directional sensor comprises an imaging device having a field of view, and
wherein capturing the data along the first axis of interest using the directional sensor further comprises:
capturing imaging data by the imaging device within the field of view, wherein the field of view is aligned along the first axis of interest with the control surface in the second position.

11. The method of claim 10, further comprising:
searching the imaging data for at least one fiducial marker associated with a destination.

12. The method of claim 10, further comprising:
identifying at least one object within the field of view of the imaging device, wherein the at least one object does not include any portion of the aerial vehicle; and
moving the control surface from the second position to a third position to maintain the at least one object within the field of view of the imaging device, wherein the field of view is aligned along a second axis of interest with the control surface in the third position.

13. The method of claim 6, wherein the control surface is joined to at least one of a fuselage of the aerial vehicle, a frame of the aerial vehicle, or a stabilizer of the aerial vehicle by a hinged connection, and
wherein moving the control surface from the first position to the second position comprises:
pivoting the control surface about the hinged connection from the first position to the second position.

14. The method of claim 6,
wherein the control surface comprises at least one of a wing, a rudder, an aileron, an elevator, a flap, a brake, a slat or a propeller blade, and
wherein the sensor is embedded into at least one of a leading edge, a trailing edge, a face or a tip of the control surface.

15. The method of claim 6,
wherein the sensor comprises at least one of a radar sensor, a laser sensor, a range camera, a depth sensor, an infrared sensor, an ultrasound imaging device or an X-ray imaging device.

16. The method of claim 6, wherein the aerial vehicle further comprises at least one addressable illuminator, and
wherein capturing the data along the first axis of interest using the directional sensor further comprises:
radiating light in at least one of a first color, a first frequency or a first wavelength along the first axis of interest by the at least one addressable illuminator.

17. The method of claim 16, wherein the at least one addressable illuminator is one of a safety light or a running light configured to radiate the light in the at least one of the first color, the first frequency or the first wavelength.

18. A method comprising:
operating an aerial vehicle in a first flight mode, wherein the aerial vehicle comprises at least one imaging device embedded into a movable control surface pivotably joined to a frame of the aerial vehicle and at least one addressable illuminator;
repositioning the movable control surface to orient the at least one imaging device toward a first area of interest;
capturing imaging data from the first area of interest using the at least one imaging device; and operating the at least one addressable illuminator to emit light of at least one of a first color, a first frequency or a first wavelength during the capturing of imaging data from the first area of interest.

19. The method of claim 18, further comprising:

repositioning the movable control surface to orient the at least one imaging device toward a second area of interest;

capturing imaging data from the second area of interest using the at least one imaging device; and operating the at least one addressable illuminator to emit light of at least one of a second color, a second frequency or a second wavelength during the capturing of imaging data from the second area of interest.

20. The method of claim 19, wherein the at least one addressable illuminator is embedded into the movable control surface.

* * * * *